(12) United States Patent
Steward

(10) Patent No.: US 12,376,565 B2
(45) Date of Patent: Aug. 5, 2025

(54) EQUINE BIOMECHANICAL ORTHOTIC DEVICE AND METHOD OF USE

(71) Applicant: Micheal L. Steward, McLoud, OK (US)

(72) Inventor: Micheal L. Steward, McLoud, OK (US)

( * ) Notice: Subject to any disclaimer, the term of this patent is extended or adjusted under 35 U.S.C. 154(b) by 0 days.

(21) Appl. No.: 18/515,648

(22) Filed: Nov. 21, 2023

(65) Prior Publication Data
US 2024/0164346 A1      May 23, 2024

Related U.S. Application Data

(60) Provisional application No. 63/426,953, filed on Nov. 21, 2022.

(51) Int. Cl.
*A01L 7/02*      (2006.01)
*A01K 13/00*    (2006.01)

(52) U.S. Cl.
CPC ............. *A01K 13/007* (2013.01); *A01L 7/02* (2013.01)

(58) Field of Classification Search
CPC ... A01L 15/00; A01L 7/02; A01L 7/00; A01L 9/00; A61D 9/00; A01K 13/007
See application file for complete search history.

(56) References Cited

U.S. PATENT DOCUMENTS 1,272,591 A    7/1918  Willett
4,253,526 A    3/1981  Alletrux
(Continued)

FOREIGN PATENT DOCUMENTS

CN    107404964 A  * 11/2017  ............. A43B 17/04
CZ        35048          8/2021
(Continued)

OTHER PUBLICATIONS

Steward, Dr. Micheal L., and Poupard, Derek, How to Enhance Soundess in Horses with Palmar Heel Pain or Navicular Disease Using a Therapeutic Shoeing Protocol to Artificially Engage the Frog and Sole (Presentation abstract), Amercian Association of Equine Practitioners (AAEP) Annual Convention, Jan. 27-29, 2007, Orlando, Florida.
(Continued)

*Primary Examiner* — Son T Nguyen
(74) *Attorney, Agent, or Firm* — Margaret Millikin

(57) ABSTRACT

A device for addressing normal cyclic limb/hoof loading that causes devastating consequences in a horse at risk for SLL or suffering from acute laminitis. Weight force/ground reaction force interaction is cyclically loaded and offloaded to enhance perfusion of the supporting lamellar apparatus, solar corium, and other hoof structures with nutrient laden blood and removal of the lymph fluid with toxic waste products. The device causes a forced cyclic hoof motion of the loaded or unloaded patient in a lateral recumbency pained hoof. The motion is applied to hydraulically force or enhance the tissue perfusion of the hoof's internal structures and enhance or reestablish normal health of the hoof. Various externally applied forces are utilized, including mechanical, electrical, hydraulic, and other manners, to increase the reduced or non-existent cyclic loading of the limb. The device can be used to measure/record movement and adjust cyclic frequencies and range of motion.

31 Claims, 14 Drawing Sheets

(56) References Cited

U.S. PATENT DOCUMENTS

| | | | |
|---|---|---|---|
| 4,605,071 | A | 8/1986 | McKibben |
| 5,253,715 | A | 10/1993 | Ovnicek |
| 5,439,062 | A | 8/1995 | Ovnicek |
| 5,566,765 | A | 10/1996 | Ovnicek |
| 5,727,633 | A | 3/1998 | Ovnicek |
| 2006/0021758 | A1* | 2/2006 | Ovnicek .................. A01L 7/02 168/4 |
| 2006/0201758 | A1 | 2/2006 | Ovnicek et al. |
| 2010/0179388 | A1 | 7/2010 | Ovnicek et al. |
| 2010/0223893 | A1* | 9/2010 | D'Arpe ..................... A61F 7/10 54/82 |
| 2011/0197554 | A1* | 8/2011 | Ruetenik ............. A01K 13/007 54/82 |
| 2012/0292056 | A1 | 11/2012 | Osborne |
| 2014/0144109 | A1* | 5/2014 | Burr ..................... A01K 13/007 54/82 |
| 2014/0213943 | A1 | 7/2014 | Billman |
| 2015/0119772 | A1 | 4/2015 | Ruetenik |
| 2016/0249597 | A1* | 9/2016 | Ruetenik ................ A01L 15/00 168/12 |
| 2017/0099825 | A1* | 4/2017 | Ruetenik ............. A01K 13/007 |
| 2020/0146272 | A1* | 5/2020 | Ingraham .................. A01L 3/04 |
| 2023/0122576 | A1 | 4/2023 | Ingraham |
| 2023/0354952 | A1* | 11/2023 | Machanian ............ A61B 5/112 |

FOREIGN PATENT DOCUMENTS

| | | |
|---|---|---|
| DE | 2020008012227 | 1/2009 |
| EP | 2910216 | 8/2015 |
| EP | 3114928 | 1/2017 |
| GB | 2575100 | 1/2020 |
| WO | 2009146861 | 12/2009 |

OTHER PUBLICATIONS

Schaaf, Kylie, Anthony, Nathan, and Pollitt, Dr. Christopher, No Hoof No Horse, (2012), Research Poster Presentation Designs.

Schaaf, Kylie, Baynham, Charlotte, and Pollitt, Dr. Christopher, Lamellar Wedge What Does It Really Mean?, (2012), Research Poster Presentation Designs.

Hircock, P., Mather and L., Caldwell, M., A Pilot Study to Evaluate a Therapeutic Shoeing System for Laminitis Using a Steward Clog and a Hoof Cast, (2014), https://www.academia.edu/43617507/A_pilot_study_to_evaluate_a_therapeutic_shoeing_system_for_laminitis_using_a_Steward_clog_and_a_hoof_cast?auto=download.

O'Grady, Dr. S.E., and Steward, Dr. Micheal L., The Wooden Shoe as an Option for Treating Chronic Laminitis, (Feb. 2009), Equine Veterinary Education, vol. 21, Issue 2, p. 107-112.

Urga, Fran, Clog on Clog: Removable System for Laminitis; The Hoof Blog, (Jul. 23, 2008) https://hoofcare.blogspot.com/2008/07/clog-on-clog-removable-system-for.html.

Oliver, A., Wannenburg, J., Gottschalk, RD, Van Der Linde, MJ and Groenveld, HT, The Effects of Frog Pressure and Downward Vertical Load on Hoof Wall Wight-Bearing and Third Phalanx Displacement In The Horse—an in vitro study, Journal of South African Veterinary Association (2001) vol. 72, Issue 4, p. 217-227.

Clanahan, Holly, Going Dutch, America's Horse Daily, (Jun. 30, 1995) www.anericashorsedaily.com.

Steward, Dr. Micheal L., Case Study of a 3 year old Quarter Horse Treated Using a Modified Wooden Shoe (EVA/Wood Shoe) Suffering Complicated Chronic Laminitis (abstract), (Dec. 1, 2010), American Ferriers Journal, vol. 36, Edition 8.

Pollitt, Christopher, Equine Laminitis: Current Concepts, (May 2008), Australian Government Rural Industries Research and Development Corporation (RIRDC); Publication No. 08/062.

Steward, Dr. Micheal, How to Enhance Soundness and Healing in Cases of Laminitis with Unilateral Distal Displacement and Sheared Heels using the Steward Clog or Steward DVA/Wood clog, Amercian Association of Equine Practitioners (AAEP) Annual Convention, Nov. 29-Dec. 2, 2023.

O'Grady, Stephen, Steward, Dr. Micheal and Parks, Andrew, How to Construct and Apply the Wooden Shoe for Treating Three Manifestations of Chronic Laminitis (2007) https://www.equipodiatry.com/news/articles/articlewoodenshoelaminitishtm.

Steward, Dr. Micheal, The Use of Therapeutic Shoeing to Enhance Soundness in a Triparte Navicular Horse (Sep. 22, 2005).

Steward, Dr. Micheal and Poupard, Derek, (Oct. 22, 2022), Duromater, Hemodynamics and the Equine Hoof.

Steward, Dr. Micheal L., Mechanical Management of Acute Laminitis, (2022) Powerpoint Presentation_Part 1.

Conklin, Dr. Britt, and Steward, Dr. Micheal L., Klimmick Full Roller Motion Shoe, (Dec. 5, 2016) https://www.americanfarriers.com/articles/8805-new-spin-on-the-steward-clog-keeps-horses-working?v=preview.

Steward, Dr. Micheal L., Mechanical Management of Acute Laminitis, (2022) Powerpoint Presentation_Part 2.

Teward, Dr. Micheal L., Mechanical Management of Acute Laminitis, (2022) Powerpoint Presentation_Part 3.

* cited by examiner

EQUINE BIOMECHANICAL ORTHOTIC DEVICE AND METHOD OF USE

CROSS-REFERENCE TO RELATED APPLICATIONS

This application claims priority to U.S. provisional patent application Ser. No. 63/426,953, entitled, "Equine Biomechanical Orthotic Device and Method of Use", filed Nov. 21, 2022, the entirety of which is incorporated herein by reference.

TECHNICAL FIELD OF THE INVENTION

The present invention relates generally to equine biomechanical orthotic devices and, more particularly, but not by way of limitation, to equine biomechanical orthotic devices applied to the equine hoof to enhance the circulation of the hoof to prevent the onset of a pathological condition or to treat a pathological condition, particularly supporting limb laminitis. Methods of enhancing the circulation of the hoof to prevent the onset of a pathological condition or to treat a pathological condition, particularly supporting limb laminitis, also are provided.

SUMMARY OF THE INVENTION

The present invention is directed to an equine biomechanical orthotic device for treating a hoof of the equine, the equine biomechanical orthotic device comprising: an upper pad adapted to be arranged below the hoof of the equine; a lower pad arranged below the upper pad, the lower pad opposing the upper pad and configured to cooperatively engage the upper pad; wherein the upper pad forms a contoured contact surface for engaging the lower pad and wherein the upper pad and the lower pad, when in assembled configuration, are adapted to allow the hoof of the equine to pitch dorsopalmarly and to roll mediolaterally.

The present invention further is directed to a method for treating laminitis and other pathologies in a hoof of an equine, the method comprising the steps of: providing an orthotic device below the hoof of the equine; causing movement of the orthotic device that creates a pitch dorsopalmarly and to roll mediolaterally, to produce a palmar pitch down of the heel region of the hoof.

DETAILED DESCRIPTION OF THE INVENTION

Figure 1:
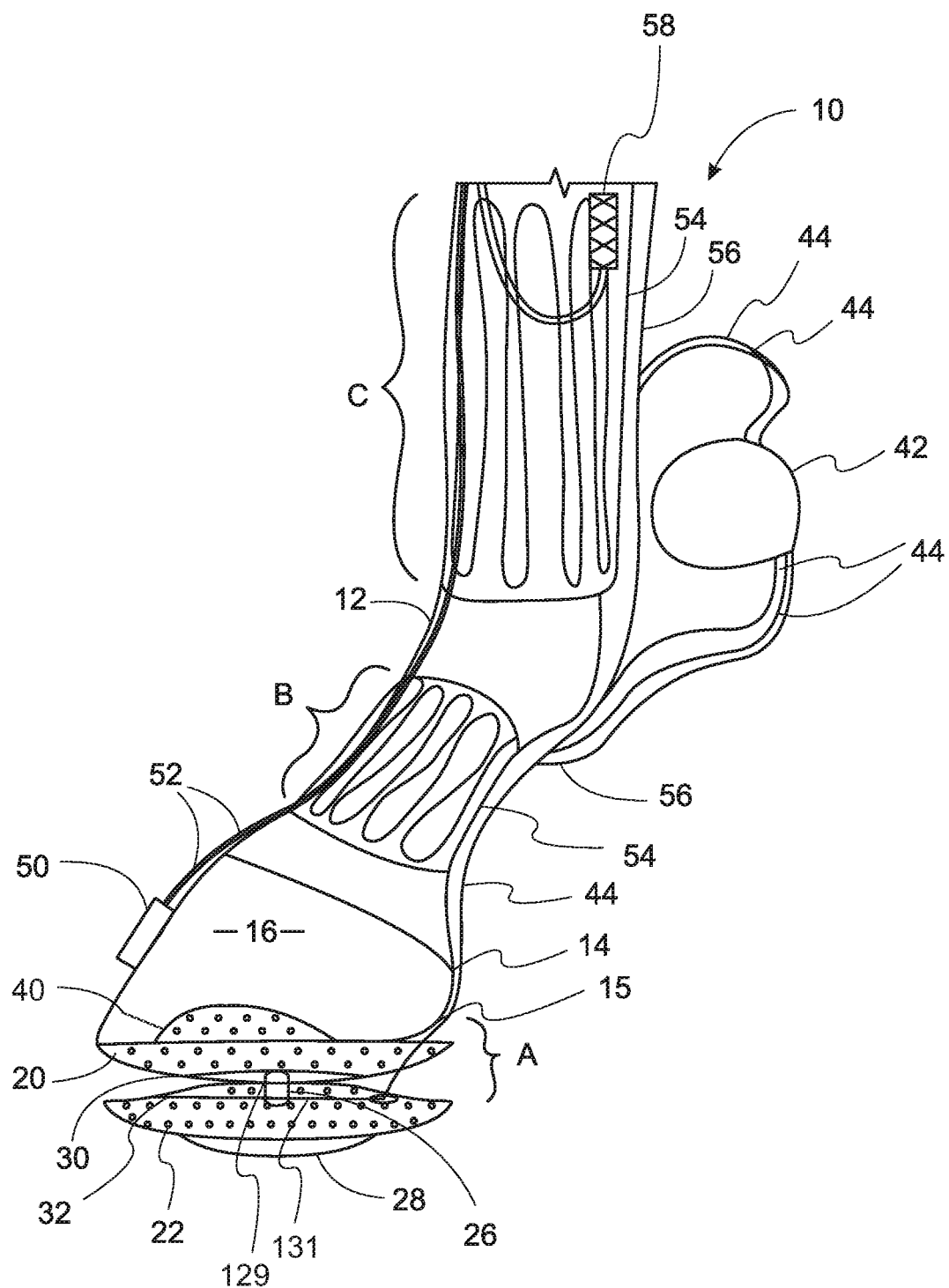
FIG. 1 is a lateral or side view of an illustrative equine biomechanical orthotic device constructed in accordance with the present invention as supported on the limb and hoof of an equine.

The economic losses due to lameness in horses is up to a billion, or more, annually. Equine lameness can be caused by a large variety of lower limb pathologies. Laminitis, ringbone and navicular inflammation are among the most common. Although there are many causes, sole bruising and other pathologies, such as laminitis, are a common cause of lameness in horses.

Laminitis, or founder, is an equine hoof condition whereby the third phalanx (P3), also called the coffin bone, begins to lose its lamellar attachment to the inner hoof wall and begins to rotate toward the bottom of the hoof or sink within the hoof capsule. The P3 forms the primary foundation of the front half of the hoof capsule. This bone is connected to the hoof capsule via the laminae. The extensor tendon attaches to the top of the P3. The lamellae attach the P3 to the hoof wall.

The equine hoof and limb are very resilient and strong, and yet fragile, structures that are subject to speeds of 75 mph and internal pressures up to 15,000 psi. The body of the horse travels at speeds up to 50 mph with a body weight of up to 2000 lbs. The hoof of the horse is the structure with which the weight forces (WF) of the horse and the ground reaction forces (GRF) interact with opposing vector forces. The design of the single digit hoof is wrought with incredibly unique features to ameliorate the GRF/WF interaction, particularly the high frequencies of impact, which are the most damaging forces. The internal architecture of the conical bony structure, primarily the P3, is primarily attached to the peripherally/external hoof wall via the suspensory lamellar apparatus. This tissue is the primary area where the high frequencies of impact are ameliorated as it suspends the third phalanx.

Laminitis is thought to result from an infection or imbalance in the horse's internal systems, including endocrine, digestive, reproductive, lymphatic, skeletal, musculature, respiratory, cardiovasculature, urinary, and nervous systems. Toxins may enter the blood stream and cause an enzymatic disruption to chemical bonds within the basal cells of the lamellae. Hormonal imbalances that cause insulin resistance or glucose uptake or dysfunction have become the leading cause of laminitis. A disruption of the lamellar circulation due to inflammatory or toxic agents may cause shunting of blood, via anastomosis, away from capillaries which feed the lamellae. Venuoles in the hoof have, relatively speaking, huge musculature walls that are pathologically activated by inflammatory agents causing the venules to undergo venospasm and reroute blood away from the lamellae capillaries, depriving the lamellae of nutrients and impeding toxin removal.

Laminitis is an inflammation or degradation of the lamellae in a horse's hoof caused by several different factors, including grain overload, steroid therapy, retained placenta, colic, toxins, generalized disease, hormonal imbalances, and others. Specifically, laminitis is a common, painful, and potentially disastrous condition of the horse's hoof where there is a partial or total failure of the distal lamellae (DL) between the P3 and the inner aspect, or the epidermal lamellae (EL) of the hoof wall. The P3 is suspended in the hoof capsule, attached peripherally to the inside surface of the hoof wall by an arrangement of structures called lamellae. Finger-like dermal, sensitive, lamellae grow outwardly from the lamellar dermis attached to P3. These interdigitate with corresponding epidermal, insensitive, lamellae that project inwardly from the inner surface of the hoof. The epidermal lamellae originate from the coronary lamellar terminal papillae and quickly attach themselves to the innermost horn tubules as they emerge their coronary terminal horn papillae. The distal lamellae are produced from the dermal corium attached firmly to the parietal surface of the P3 and continuing to the palmar axial and abaxial portions of the wing(s) of the P3 as the bars of the hoof. The bar horn tubules are produced by the terminal tubules of the sole corium originating or attached to the wings of the P3 dorsally and connected to the heel walls as the two structures form the angular buttress of the heel. The 100 to 200 secondary lamellae project from each, approximately 600, of the primary lamellae tree limb arrangement roots into the dorsal, parietal surface of P3. The interconnection of the dermal and epidermal lamellae anchors the P3 to the hoof wall. There are approximately 600 primary epidermal wall lamellae (PEL) that have outcroppings of about 100 to 200 secondary epithelial lamellae (SEL) that interdigitate, similar to a Velcro-like or hook and loop attachment, to the P3 originating anchored primary dermal lamellae (PDL) and their secondary branches, or secondary dermal lamellae (SDL), in each of the four feet. This dermal lamellar corium also contains a vascular, nervous system that control blood flow to this area. The nerves are necessary for sensory, as well as pressure and thermal regulation, within the normal hoof. Collectively this system, the insensitive avascular epithelial wall lamellae and sensitive vascular dermal lamellar corium area, is referred to as the suspensory lamellar apparatus or SLA. The distal surface of the third phalanx sometimes can be significantly supported or loaded by the sole of the hoof in contact with the ground. The sole is formed by the solear terminal papillae attached to the distal corium of the P3. These are firmly attached to the distal bony surface of P3 and are subject to compression overload. The white line (WL) is the tissue which connects the descending wall and bars to the sole. It originates at the distal end of the suspensory lamellar apparatus and continues to the ground on the outer border of the sole and inner border of the wall tubules. The solear corium is connected to the inner border of the white line starting at the white line/solar terminal papillae's mitotic area at the distal/peripheral border of the P3. This arrangement continues to the wing, or heels, of the hoof and forms and connects the approximately 70-degree angled buttress of the heel, so named as it is the horizontal connection of the heel wall to the axially arranged hoof bars. The white line makes the angular turn as it maintains the structural connection of the sole-to-the-wall, bar horn tubules.

Acute laminitis occurs when a portion or all of the dermal lamellae are enzymatically or toxicologically damaged and no longer can maintain a normal, functional attachment to the epidermal lamellae, thus resulting in a painful lameness. The initial, defining damage is to the basal cells of the basement membrane of the dermal lamellae and subsequent basement membrane physically/enzymatic detachment in the connected area of the secondary epithelial lamellae/ secondary dermal lamellar connected area. As inflammation and chemical degradation from this acute condition increases and cascades, then edema, pain, inflammation may ensue, ultimately resulting in ischaemia and the resulting damage or death of the lamellae. As the condition cascades, the lamellae in the front of the hoof (or the dorsal wall) have variable weight and dynamic, locomotive moment forces that can overload the lamellae as they continue to stretch and shear, allowing P3 to detach and migrate away from the hoof wall. This allows the distal border of P3, which is the crescent-shaped, ¾-circle portion of the hoof, to drop or rotate to varying degrees in a particular or variable section(s) of the hoof. In severe cases, all of the lamellae deteriorate and detach, and the P3 sinks within the hoof capsule and may drop through the bottom of the digit's sole, or the hoof may totally detach and shed, and after which the horse is euthanized.

In cases of supporting limb laminitis (SLL), the laminitis pathology is brought about by the consistent, unrelenting overloading of a normal leg and its vasculature after the contralateral leg has suffered a devastating injury and is unable to support its share or partial share of weight load. Abnormal architecture of the loaded hoof, such as underrun heels, predisposes these feet to supporting limb laminitis. This is a condition that occurs in 20 percentage of horses that are forced to stand on one leg because of catastrophic injury to the opposite leg. For example, the Kentucky Derby winner, Barbaro, who fractured a hind leg in the Preakness® horse racing expedition and underwent surgical repair, only to have to be euthanized due to the good hind leg developing and suffering supporting limb laminitis.

Oxygen disruption was once thought to play a huge role in typical laminitis, but research has proven glucose plays a larger role in most cases, with the exception of supporting limb laminitis. Scientific studies have shown ischemia, or low oxygen, to be a significant initial, even inciting, factor in the pathological process of supporting limb laminitis, rather than the dysfunctional glucose metabolism pathway in most cases of laminitis. Other causes of laminitis were once thought to have an ischemic component as a major or primary inciting cause, but research shows that the nutrient glucose plays a more significant inciting role than does low oxygen. Both nutrients are dependent on proper circulation to bring nutrition to the vital suspensory lamellar apparatus that connect and anchor the hoof wall to the P3. Circulatory and lymphatic systems are responsible to remove a variety of biomedical toxins from the live tissue within the hoof. The equine hoof is much like the brain in that it requires an enormous amount of glucose to function, as well as oxygen. Prolonged circulatory dysfunction leads to the deleterious cascading events that occur in cases of laminitis.

The lamellae are composed of an avascular wall lamellae primary epithelial lamellae with their off shooting secondary epithelial lamellae. These attach to the hoof wall tubular complex-abaxially—and are attached axially to the basement membrane of the secondary dermal lamellar who join with their supporting primary dermal lamellae. The circulatory system serving the SL/hoof wall/PL is intermingled within the dermal lamellar structure.

The capillaries within the distal lamellae are very permeable compared to other vasculature and are dependent on movement of their surrounding structures to function and maintain health. They are under the influence of external enzymatic toxins that can result in damage to the fragile basal cells of the secondary epithelial lamellae that are the critical connection of the secondary epithelial lamellae to the basement membrane of the secondary dermal lamellar. Several features of the hoof vasculature are unique, including arteriovenous (AV) shunts which bypass the lamellar capillary beds. These normally are used for thermoregulation but can be activated abnormally/detrimentally, resulting in the starvation of the lamellar dependent structures of nutrients. Glucose is a vital nutrient to the lamellae whose glucose usage mimics that of the white matter of the brain and must be properly supplied to the hoof's lamellae as well as oxygen. The hoof's lamellar cells do not depend on insulin for glucose uptake and are damaged by elevated levels of insulin. The number one cause of laminitis in affluent countries is hyperinsulinemia, or grass founder.

The valveless venous network of the hoof is designed to act as a fluid filled balloon to ameliorate the GRF/WF vectored interactions. The movement of the venous blood is movement dependent to migrate back up the limb to the heart— without the aid of peripheral venous valves until the fluid exists the hoof.

The biohydraulic system, including the hemodynamic, blood and lymphatic systems, are normally dependent on normal ambulation or merely the horse shifting his weight from limb to limb. Research has shown that the absence of movement between the hoof wall and the P3 lamellar zone results in unexpected, never-before-seen-histologically, apoptosis, or programmed cellular death of the vital basal cells that connect the secondary epithelial lamellae to the basement membrane of the secondary dermal lamellar. This is the primary lesion of laminitis, histologically speaking.

The lymphatic system of the hoof is virtually ignored by academia's researchers, but clinical evidence suggests this "sewer system" may play a vital role in keeping the hoof healthy. The lymphatic system of the hoof mimics that of the brain in that it has only a sparse vessel system in the matrix of the organ but has an extensive peripheral collection system, a coronary band of hoof-dura matter of brain. The brain and the inner tissue of the hoof both share a very rigid peripheral encasement in the skull or hoof wall. The lower limb of the horse has no skeletal muscles to help propel the lymph back to the chest for recycling or processing. This renders the limbs subject to lymphadenitis and helps to explain the negative effects of hoof immobility. The lymphatic system is totally motion dependent to function properly.

Studies have shown the loading and unloading of a normal hoof allows the blood to circulate in the healthy hoof and that interfering with the cyclic load/unload activity can lead to lamellar dysfunction after prolonged circulatory disruption. Venograms and other studies have shown the large centrally orientated and internally located terminal arch has a mechanical valve closure effect formed by the loaded deep digital flexor tendon that is opened and released when the hoof is rotated in the distal interphalangeal phalangeal joint to a 20 degree, or more, palmar/plantar angle.

In the developmental stage of laminitis, blood flow increases via vasodilatation to the area of the lamellae. In many laminitic cases, cryotherapy has been demonstrated to be effective in stopping the enzymatic degradation of the lamellar basal cell attachments, if implemented in a timely, effective manner. Cascading events disrupt the suspensory lamellar apparatus cellular attachments in laminitis and, inevitably, the lamellae cells suffer the measurable, ongoing lack of sufficient blood flow. The basement membrane/attachments (hemidesmosomes) of the dermal lamellae basal cells enzymatically degrade, and the attachment is weakened and may fail completely. The disruption of these chemical, collagen, and fibrous protein bonds allows the hoof and P3 attachments to fail and overload forces to a particular area of the hoof, causing bony displacement of the overloaded damaged lamellae.

The deep digital flexor tendon attaches to the bottom, palmar, curved surface of the coffin bone and is critical in locomotion and support. This tendon is an extension of its proximally located muscle, which can pathologically contract in response to the pain of the shearing lamellae. The deep digital flexor tendon must be engaged for forward motion in the horse to occur. As the muscle contracts, the tendon causes extra moment arm forces to the P3 and may result in more overload shear forces to the damaged lamellae suspensory apparatus. Once this pain cycle occurs, it must be ameliorated before proper healing can occur. Otherwise, it sets in motion devastating, enzymatic lysis of the vital supporting cells of the suspensory lamellar apparatus. The contracted, loaded deep digital flexor tendon has a valvular effect on the large vital arteries comprising the terminal arch and has to be unloaded, via breakover, to unload the compressed vessels. A variety of cascading biomechanical, or physical, forces can cause further damage, via a vicious ongoing cycle, to the suspensory lamellar apparatus.

One particular commercial shoe that has found worldwide acceptance in the treatment of laminitis is commonly referred to as the Steward Clog or the Wooden Shoe. This orthotic is designed to allow breakover adjustment by centrally and ergonomically loading the sole, or the peripheral lever reduction of moments to the suspensory lamellar apparatus, of the affected hoof whereby the horse can easily find a more comfortable position by adjusting the palmar/plantar angle and redistributing weight to help transfer pathological forces away from pained areas of the hoof. The Steward Clog is a self-adjusting, biomechanical orthotic wooden shoe. It can be screwed, cast, and/or glued directly to the hoof. The worldwide usage of the Steward Clog for the acute or chronic laminitic case, as well as a variety of other hoof pathologies/dysfunctions, operates on the principle that atraumatic, biomechanically sound motion, whether ambulation or off-loading, can be live-saving in the damaged hoof. The use of breakover, rollover modifications, coupled with weight redistribution, P3 stabilization, and atraumatic movement has been proven to enhance healing and, oftentimes, lifesaving to the pained patient.

The subject invention is explained by reference to its use in an illustrative, exemplar treatment of laminitis, although the subject invention may have application to other equine pathologies. The subject invention is an equine biomechanical orthotic appliance that is applied to the equine hoof to enhance the circulation of the hoof and prevent the onset of a pathological condition professionally referred to as supporting limb laminitis, also called SLL or contralateral limb laminitis. The subject invention increases hoof hemodynamics, including blood flow and reduction of harmful forces on the hoof. The hemodynamic system of the hoof refers to the circulation that serves to carry nutrition to the cells and remove toxins as it also hydraulically ameliorates the concussive forces of hoof impacting the ground, which would be devastating to unprotected hoof tissue.

The subject invention also is applicable in cases of acute laminitis whereby extended, unrelenting weight loading of the hoof, caused by merely standing, is extremely painful and contraindicated. This subject invention allows the hoof to be mechanically forced to ergonomically move, whether loaded, e.g., when the horse is standing, or unloaded, or when the horse is lying down. Proper movement of the hoof is necessary to engage or reengage the static, hemodynamic, circulatory system of the hoof, via frog and digital cushion engagement, and is vital for the health of the hoof. The present invention employs biomechanical concepts of breakover modification, unloading, or weight redistribution away from painful/damaged areas (unloading), and loading the less painful areas, usually the caudal or frog area of the foot. The present invention also employs moment arm reduction to the damaged wall, suspensory lamellar apparatus and deep digital flexor tendon, and stabilizes the detaching P3 within the hoof.

In cases of SLL, scientific studies have shown ischemia, or low oxygen, to be a significant initial factor in the pathological process. Other causes of laminitis were once thought to have an ischemic component as a major (primary) inciting cause, but research shows that the nutrient glucose plays a more significant inciting role than does low oxygen. Both nutrients are dependent on proper circulation to bring nutrition to the vital suspensory lamellar apparatus that connect and anchor the hoof wall to the P3. Circulatory and lymphatic systems are responsible to remove a variety of biomedical toxins from the live tissue within the hoof. The equine hoof is much like the brain in that it requires an enormous amount of glucose to function, as well as oxygen. Prolonged circulatory dysfunction leads to the deleterious cascading events that occur in cases of laminitis.

Laminitis in the lamellae of a single hoof can occur whenever a horse's limb is forced to bear weight for prolonged periods of time. This can occur when an injury, such as a bone or joint fracture, or a disease process, such as septic arthritis, in the contralateral limb is so painful that weight bearing is impossible. After a few days of unrelieved weight bearing, the supporting limb, oftentimes develops lamellar pathology, frequently to a severe degree so that, for instance, the entire suspensory lamellar apparatus is sheared. The case for ischaemia as the cause of supporting limb laminitis appears to be clear cut. The evidence comes from in vitro studies using digitized subtraction angiography (DSA) in isolated perfused horse limbs obtained after humane slaughter at a knackery. When a mechanical press was used, to place the limb in the loaded position, e.g., the fetlock fully extended, there was zero perfusion of the foot below the level of the coronary band. When the limb was not loaded, perfusion through all the major vessels of the foot was normal. Presumably a similar situation prevails in vivo and chronic lack of perfusion eventually triggers a lamellar pathology indistinguishable from that initiated by other causes. This form of laminitis may be prevented, or at least lessened in severity, if the supporting limb is firmly wrapped in an elastic support bandage and shod with an effective support shoe, such as the Steward Clog. The horse should be provided with a deep bed of wood shavings or sand so that it can lie down comfortably and allow blood to circulate through its feet. Deep, compliant bedding also allows the horse to find a foot, orthotic/hoof position that may promote the circulation. The injured limb(s) should be treated promptly and fitted with a cast or splint so that it can begin to take its share of weight bearing. Pain should be controlled with analgesics for the same reason. Approximately fifteen percent (15%) of extended overloaded single limb injuries will suffer a degreed manifestation of suspensory lamellar apparatus.

Proper medical treatment of laminitis includes a variety of different therapies, because the inciting cause or damage is usually systemic and varied; however, in addition to dietary restrictions and medical interventions, biomechanical techniques described may be applied to the hoof to relieve pain and stabilize the P3 to promote the healing process. In the past, these various biometric treatments have included corrective trimming of the hoof, application of frog supports and the use of therapeutic shoes or pads, such as the heart bar shoe and the devices. These methods and devices have achieved only limited success in ongoing laminitis and have not been proved to substantially or significantly reduce the risk of supporting limb laminitis. These conventional treatment regimens have significant shortcomings and poor success rates.

Conventional horseshoes have been directed at protecting the hoof wall portion of the foot. These are directed to impact the outline of the hoof only, with some rare attention to the frog, and do not relate to the entire area of the lower surface of the foot. The forward portion of the sole, especially, has been ignored. Thus, the conventional horseshoes do not act to spread impact throughout the sole portion of the hoof as well as the hoof wall and load share. The net result of this is that the natural impact, heel spreading and circulation pumping action (the hemodynamics) of the hoof is not properly enabled by conventional horseshoes. The conventional methods accurately reproduce the conditions of an unprotected hoof on natural terrain in conjunction with their meritorious effects on protecting the hoof wall against unnatural terrain. Furthermore, the conventional devices are not directed at reversing the damage, once it has occurred, or in providing therapeutic effects to the lame horse. This subject invention utilizes biomechanics with particular attention to the greatly enhanced circulatory pumping action the biomechanic orthotic device.

In one embodiment of the invention, the biomechanical orthotic device of the present invention produces a forced mechanical pitch movement to the hoof resulting in a 25 degree or more pitch distal and a negative 6 degree or more negative pitch motion to the hoof. The orthotic also provides biomechanics to allow reduced forces to allow roll and jaw motions. These movements allow the unloading of compressive valve-like structures within the loaded hoof that impede circulatory and lymphatic fluid systems. The motion of the biomechanical orthotic device and hoof causes compression/ decompression of areas of the hoof that result in pumping effects within the rigid hoof capsule. This mimics the normal hemodynamic system of the hoof that dissipates the tremendous forces of the running horse to utilize the hydraulic fluid dynamics of destructive forces, i.e., high frequencies of impact, amelioration, circulation enhancement.

The subject invention forces the normal circulatory enhancing hoof movements, e.g., hydraulics, to produce internal hoof hemodynamics and health, with or without the horse standing. This is particularly important where a majority of the secondary epithelial lamellae portion of the suspensory lamellar apparatus have been degraded or sheared and the hoof wall/third phalanx attachment has been severely damaged. The pained patient often is unwilling to stand and might shed the hoof if the horse stands too long, by overloading the suspensory lamellar apparatus. Movement is vital to the circulation and health of the hoof, but the suspensory lamellar apparatus is in danger of overload shearing of all the suspensory lamellar apparatus lamellae and hoof shedding—even with a minimal amount of standing or walking time. This subject invention forces the normal circulatory enhancing hoof movements with or without the horse standing.

The subject invention provides a system that encourages or forces normal blood flow through a static, overloaded hoof in an acutely affected laminitic patient and enhances and encourages, both mechanically and a-traumatically, a normally loaded or overloaded circulatory system within the hoof to be stimulated and allowed to function. The biomechanics of the subject invention will engage and promote a healthier hemodynamic circulatory function within the suspensory lamellar apparatus using the dynamic, novel orthotic appliance of the present invention. Application of the biomechanical orthotic appliance will provide a more normal, functional environment within the hoof that will significantly reduce the pain of laminitis and will accelerate and activate healing in acute laminitis. The increased blood flow and ill-defined lymphatics, encouraged or induced by this orthotic, will aid in tissue perfusion, oxygenation, and nutrition transport and will help prevent SLL in highly susceptible cases.

The subject invention provides an equine biomechanical orthotic device having a hoof pad orthotic that will serve to move the breakover in a horse's hoof posteriorly, or caudally, to its normal position, and will reduce shear and tension forces to the suspensory biomechanics lamellar apparatus in acute laminitic cases. The subject invention will aid and promote circulation in the supporting limb lamination prevention (SLLp) cases. Palmarly placed breakover reduces moments to the overloaded SLLp patient, and will allow easier frog and hoof movement.

The subject invention provides an equine biomechanical orthotic appliance that will permit a wide range of breakover adjustments, whether they are anteriorly (dorsally), posteriorly (caudally), medially (pitch) or laterally (roll) of the normal position. This substantially reduces the pain and shear moment forces on the suspensory lamellar apparatus in the acute laminitic cases. Reducing moments via dorsolateral (pitch) or mediolateral (roll) breakover modifications reduces shear forces to the suspensory lamellar apparatus. Turning increases the shear forces on the quarter regions of the hooves by 40%. These adjustments ease the forces on the overloaded (normal) hoof of the SLLp patient, thus encouraging and easing movement in a variety of directions. Terms of roll, pitch, and jaw can be applied to the nomenclature in describing the orthotic appliances use of particular biomechanics that alter moments in the hoof's kinematics.

Laminitis and other lower limb pathologies may benefit if the breakover point of the affected hoof is moved posteriorly, or caudally, from its normal position, at or below the toe of the hoof, to a position near the dorsal distal border of the P3. In patients with laminitis, this relocation of the breakover results in both immediate pain relief and the acceleration of healing by relieving shearing forces on the lamellae. It also reduces painful movement to the third phalanx joint when ring bone or navicular pathologies are present. This orthotic will provide benefits from breakover/ rollover, collectively referred to as pitch, manipulation requiring less torque on the power supply forcing motion of the hoof, horse's weighted leg, and upper portion of the orthotic or foot pad. It also enhances the hemodynamic system, thereby, enhancing healing in several other hoof pathologies. In the loaded hoof, the force to lift the horse's caudal hoof with a small, hoof mounted, self-contained mobile device could be overwhelming due to the consideration of practicality, such as size and mobility, and safety, such as DC versus AC power supply, of the orthotic mechanical device.

Breakover, as referred to herein, is that point in the movement of a horse's limb when the carrying function of the forelimb ends and the horse's knee unloads, or bends, i.e., lifting the heel of the hoof off the ground and beginning the rotation of the hoof about its toe axis of rotation. Breakover occurs when the heel starts to leave the ground and ends when the toe leaves the ground, thus beginning the swing phase of locomotion. The stance phase of locomotion is when the hoof is in ground contact.

While the normal load carrying function of the limb is being reduced, or unloaded, during breakover, significant forces are still applied against various portions of the hoof until it is completely released from the ground. Because the most significant breakover forces, via the deep digital flexor tendon, are brought to bear against the suspensory lamellar apparatus of the dorsal toe wall of the hoof, these forces exacerbate the pain caused by the lamellar pathology and tend to promote the undesired, cascading events which includes lamellar shearing. Prior to breakover, the force produced against the bottom of an unshod or normally shod hoof is distributed over the entire area of the hoof, but the walls are most often bearing a disproportionate portion of the load. Accordingly, during breakover, the upward vector force of the hoof's ground reaction force is concentrated on the dorsal hoof wall's suspensory lamellar apparatus. This area generally is the most overloaded, pained area of the damaged suspensory lamellar apparatus, especially damaged or overloaded during breakover. The upwardly directed vectored moment arm force produced by the GRF, interacting with the downward force generated by the horse's weight WF, develops a force vector that tends to bend the wall of the hoof into a slight concavity, or dish shape, with forces that can result in the suspensory lamellar apparatus being further overloaded through the dorsal border of the distal phalanx and displacing the dorsal wall away distopalmarly from the P3. If the lamellae are inflamed or already stretched or torn, the force produced on the toe of the hoof at breakover increases the possibility of overload structural damage to the lamellae, and result in collateral, cascading, secondary damage to the attaching suspensory ligaments, tendons and joints of the phalangeal bones, thus exacerbating an already injurious condition that intensifies the horse's pain and obstructs the healing process. Shearing of the lamellae will occur if the damaged area is sufficiently overloaded or if the suspensory lamellar apparatus damage is substantially significant.

Accordingly, if breakover is adjusted to a position below the dorsal distal border of the P3, the resultant reduction in moment arm forces helps to stabilize the coffin bone from further rotation and promotes the healing process by ameliorating the deleterious forces that are causing the downward displacement of the P3 lamellar shearing and solear tissue deteriorating.

Significant repositioning of breakover is accomplished with the present invention by securing a novel upper pad to the underside of the affected hoof. In its aerial view, the upper pad is shaped like the ground-contacting surface, e.g., the sole, wall, and frog of the horse's hoof. The depth or thickness of the upper pad may vary with the size of the foot the device is being applied to. Pad thickness may influence or dictate the distance that the breakover is to be moved axially within the periphery of the hoof wall. The anterior or dorsal surface of the upper pad is tapered or sloped caudally, or posteriorly, from the upper pad's hoof-contacting dorsal surface toward its ground-contacting surface. The line of intersection between the planar ground-contacting surface of the upper pad and the sloped dorsal (anterior) surface of the pad constitutes the modified breakover line.

The subject invention employs multiple biomechanics and therapies to achieve a number of advantages that may be obtained in a compromised or over-loaded hoof. Cryotherapy has been scientifically proven to stop the enzymatic, toxin induced degradation of the basal cell bonds/cellular health of the secondary epithelial lamellae to the basement membrane of the secondary dermal lamellae, if properly and timely applied to the at-risk patient's hooves and limbs. The subject invention also employs the use of vibration to the hoof proper and just behind the carpus, or the knee and front leg, or hock on hinds. Vibration therapy provides motion to the internal structures of the hoof and alters pain perception. The vibration may provide a startle stimulus for the carpus to be flexed, thus contributing to the unloading of the hoof in the SLL patient.

Excessive weight-bearing load with altered ambulatory patterns, specifically reduced limb cyclic loading frequencies, may interfere with the lamellar blood perfusion sufficiently to damage the lamellae and can drive the progression of SLL to acute laminitis in the supporting limb as well as causing resultant lesions in the lamellae of the other limbs. Monitoring and enhancement of limb load cycling activity are key strategies that may lead to successful prevention of SLL by ensuring adequate lamellar perfusion. New evidence confirms that ischemia (tissue hypoxia, anoxia) owing to a lack of normal cyclic limb loading/unloading, leads to cell dysfunction and death within the lamellae, and this is not confined to the contralateral, supporting limb alone.

The subject invention will encourage an increase in cyclic limb loading/unloading of specific regions of the suspensory lamellar apparatus, even with the limb fully loaded, with the use of forced hoof motion to alter the interlamellar/intralamellar hydraulics by cyclically forcefully altering load/motion to regions of the lamellar apparatus and corium of the sole vascular network of the treated hoof.

The subject invention can be used with modern GPS and gyroscopic/internet connected devices to track and record hoof/limb activities.

Other objects, features and advantages of the present invention will be apparent on a reading of the following description of the invention, taken in conjunction with the accompanying drawings.

Turning now to the drawings in general, and to FIG. 1 in particular, there is shown therein a lateral view of an equine limb 12 and hoof 14 upon which is positioned a biomechanical orthotic device 10 constructed in accordance with an illustrative embodiment of the present invention. As used herein, the term "equine" includes all animals of the genus *Equus*. The orthotic device 10 may be arranged below the hoof 14 and comprises an opposing upper pad 20 and an opposing lower pad 22, which are connected with a pivot joint 26 around the center of pressure of the hoof. The upper pad 20 and the lower pad 22 should be constructed of a material that is sufficiently rigid to support the weight of the equine and to house or support or attach components of the equine biomechanical orthotic device 10, yet which are capable of attaching to the hoof 14 of the equine. In one embodiment of the invention, the upper pad 20 and the lower pad 22 may be constructed from a variety of materials, including wood, carbon fiber, rubber, aluminum, urethane, nylon-carbon fiber, ethylene vinyl acetate (EVA), and combinations thereof.

To avoid further trauma to the patient, the upper pad 20 may be attached to the hoof 14 by screws, casts, and/or glue. In one embodiment of the invention, special stainless 1.25 inch (3.175 cm) screws may be pre-set in the distal wall parameter of the hoof wall 16 from the top or proximal side and screwed distally, or downwardly, into the upper pad 20 using farrier nail placement areas and techniques. Glue on the hoof wall 16 to the upper pad 20 may complement the screws to further insure the attachment of the upper pad to the sole of the hoof 14. In one embodiment of the invention, the upper pad 20 is secured to the sole 15 of the hoof 14 with adhesive or a cast 24. Two inch (5.08 cm) or three inch (7.62 cm) fiberglass hoof casting may be used to secure the upper pad 20 to the hoof 14 and to reduce shear forces on the hoof wall 16.

The opposing upper pad 20 forms a contoured contact surface 30, and the opposing lower pad 22 forms a contoured contact surface 32. The opposing upper pad 20 and opposing lower pad 22 will be conformed as to allow their respective contact surfaces 30 and 32 to pitch up to 25 degrees dorsopalmarly, meaning toe down, and to be able to roll mediolaterally up to 5 degrees in both planes. The contour of the contact surface 30 of the upper pad 20 and the contour of the contact surface 32 of the lower pad 22 will allow the upward displacing toe to produce a palmar pitch down of the heel region. This pitch allows the valvular effect of the deep digital flexor tendon, the digital cushion and P3 on the terminal arch, which is the primary blood supply to the third phalanx, and the distal two-thirds of the suspensory lamellar apparatus and arteriole blood to be pumped into the interdigital arteries of the third phalanx and on into the suspensory lamellar apparatus. The biomechanics afforded the upper pad 20 and lower pad 22 will reduce moment arm forces to the equine biomechanical orthotic device 10 and to the entire perimeter of the sole 15 of the hoof 14. The movement of the upper pad 20 and the lower pad 22 is accomplished in a manner yet to be described The upper pad 20 may be shaped using very similar design features of the lower pad 22, but to achieve a large range of motion, the lower pad 22 may have a forward sloping profile to allow the patient to self-adjust stance or breakover (pitch) while the upper pad 20 has a forced, cyclic pitch. These pitch features of both the upper pad 20 and lower pad 22 may be adjusted for different horses to compliment various hoof and limb conformations and individual patient limb loading preferences. The depth thickness at the heel region of the lower pad 22 may exceed 1.5 inches (3.81 cm) to accommodate the internal components. The thickness at the toe region of the lower pad 22 will taper to a rolling or curved 0.75-inch (1.9 cm) height, with the contoured contact surface 32 of the lower generally flat. Abnormal hoof solear conditions may dictate the upper pad 20, where in contact with the hoof 14, be modified to allow even distribution of WF to the solear/shoe interaction. The upper pad 20 may have a sloping profile on the distal toe surface, very similar to the contour of the ground surface of the lower pad 22, but the caudal distal, or bottom, portion of the upper pad 20 has a "negative" wedged profile, or a negative palmar/plantar angle (NPA) to allow an exaggerated, variable unloading range of motion. The negative profile will allow the weighted foot to positionally unload the suspensory lamellar apparatus of the dorsal hoof wall, with varying percentages of weight, load, shear, tension, and compression forces.

In addition to a sloping anterior surface of the lower pad 22, its caudal or posterior, medial and lateral edge surfaces may be tapered inwardly toward the center of the lower pad, to address a heretofore overlooked issue of mediolateral movement and strain on ligaments, tendons and the digital phalangeal joints, which aggravates and intensifies lower limb pathology. Because each case of laminitis or joint arthritis has special requirements for the relief of medial or lateral strain or roll, it may be necessary to offer more breakover relief to one side of the limb than to the other. Moreover, each limb 12 may have separate requirements for optimal relief. These features are important on the lower pad 22 but are only employed lateral/medially-roll on the upper pad 20.

The equine biomechanical orthotic device 10 may be attached to the wall 16 of the hoof 14 by a variety a means, including nails, screws, glue, hoof casts and combinations thereof. In one embodiment of the invention, the upper pad 20 is attached to the hoof wall 16 with hoof glue, such as Equilox® adhesive or Superfast® adhesive, or with a cast 24. Hoof casting, such as a two-inch (5.08 cm) or three-inch (7.62 cm) fiber cast may will encircle the periphery of the upper pad 20 distal wall and heel areas and extend distally to encompass the sides of the upper pad. This may give added structural support to the biomechanical orthotic device 10 to prevent the horse losing the device during therapy.

A detachable base plate or pad 28 may be attached to the lower pad 22. The base plate or pad 28 can be removed or changed to create more or less biomechanic variability, depending on the individual needs of the patient. In one embodiment of the invention, a bubble shoe is provided as the base plate or pad 28 and provides significant mobility with the least amount of moment arm force to the suspensory lamellar apparatus. A bubble shoe 28 reduces leverage on or around the hoof 14, permitting the horse different options for loading the hoof. However, a bubble shoe 28 may be too unstable or too mobile for a particular case and alternative base plates may be employed in the invention, such as wedges and flat plates.

Turning now to FIGS. 2, 3, 3A and 4, but with continuing reference to FIG. 1, the equine biomechanical orthotic device 10 may further comprise a cryo/compression solar bladder 40 which may be positioned proximal to, or inserted in, the base of the third phalanx for the purpose of cooling the hoof 14. Cryotherapy aids in prevention of laminitis. Toxins may enter the blood stream and cause an enzymatic disruption to chemical bonds within the basal cells of the lamellae. The cryo/compression solar bladder 40 is intermittently pressurized in a manner yet to be described to cool the suspensory lamellar apparatus and to produce pressure beneath the base of the third phalanx between the sole 15 of the hoof 14 and the upper pad 20 of the orthotic device 10. For each ten degrees Fahrenheit by which the temperature of the hoof is lowered, the enzymatic degradation and cell metabolism is reduced by 50%.

One or more cryo/compression tubes 44 exit the hoof 14 in the medial and lateral sulci of the frog 60 for a pampiniform (heat/cold exchange) effect. A first vibratory motor 50 may be secured to the hoof wall 16 to aid in circulation and pain control. Vibration therapy provides motion to the internal structures of the hoof 14 and alters pain perception. The first vibratory motor 50 may have one or more wires 52 secured in the region of the cryo/compression tubes 44 running up the bulbar/heel region of the hoof 14 and up the limb 12. The cryo/compression tubes 44 are secured with tape/wraps 54, such as compression wraps 54, beneath the one or more zones of cryo/compression on the distal limb 12.

Figure 2:
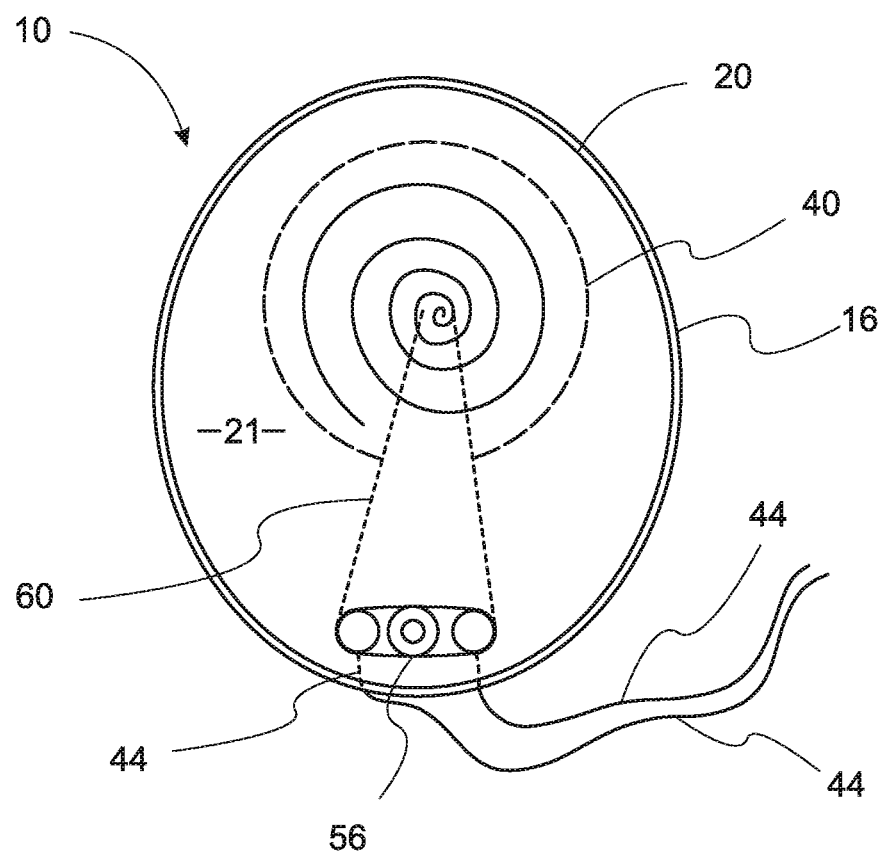
FIG. 2 is a view of the top side of an upper pad of the illustrative equine biomechanical orthotic device of the present invention.
Figure 3:
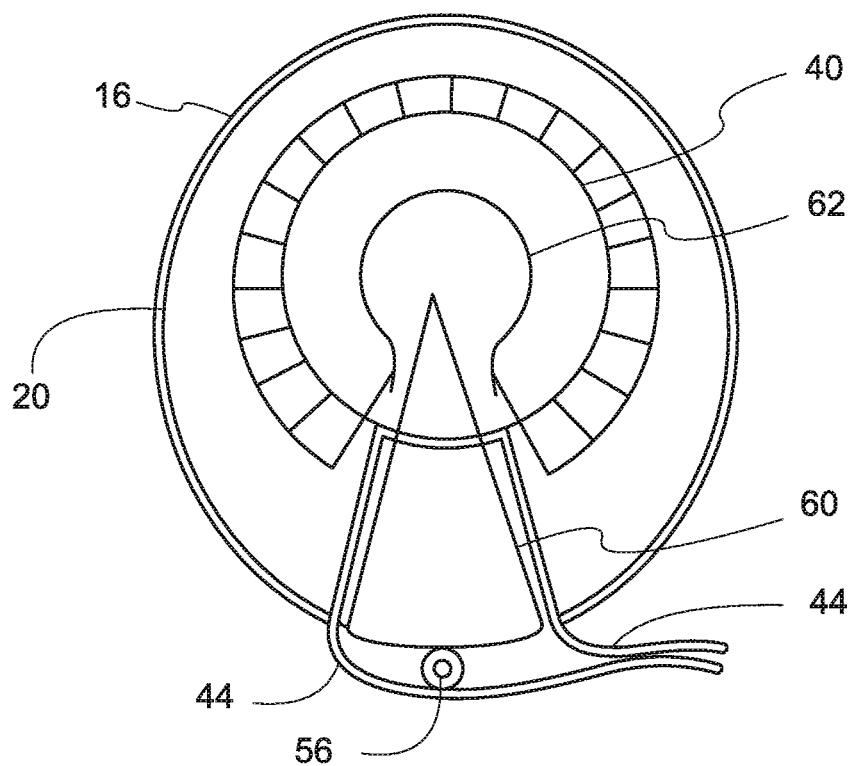
FIG. 3 shows an illustrative inflated cryo-compression solar bladder of the equine biomechanical orthotic device of the present invention and demonstrates an approximate location and relationship of the equine biomechanical orthotic device with respect to the terminal arch artery and circumflex artery of the equine.
Figure 3A:
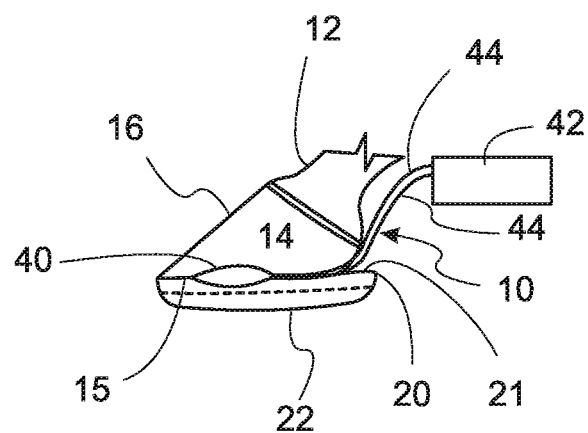
FIG. 3A is a lateral or side view showing placement of the illustrative inflated cryo-compression solar bladder of FIG. 3 and demonstrates an approximate location of the inflated solar bladder beneath the base of the third phalanx to produce pressure between the sole of the hoof and the biomechanical orthotic device.

As illustrated in the dorsal view of the hoof 14 shown in FIG. 2, and the lateral view in FIG. 3A, the cryo/compression solar bladder 40 is positioned over a top surface 21 of the upper pad 20, proximal to or inserted in the base of the third phalanx for cooling of the hoof 14 of the equine. The cryo/compression solar bladder 40 is inflatable and comprises flexible, inflatable materials. The cryo/compression solar bladder 40 is inflatable by means of a cryo/compression unit 42. Cryo/compression tubes 44 extend from the cryo/compression unit 42 to supply cryotherapeutic fluid to the sole 15 of the hoof 14. Suitable cryotherapeutic fluids include liquid nitrogen, liquid nitrous oxide and argon gas.

A drive or power cable 56 from a direct current electric motor (not shown) powers the cryo/compression unit 42. It will now be appreciated that one purpose for which the upper sole 20 and lower sole 22 are generally oval in shape is to protect the drive cable 56 and the cryo/compression tubes 44 that are attached to the cryo/compression solar bladder 40. The cryo/compression tubes 44 not only deliver the cryotherapeutic fluid to the sole 15 of the hoof 14, but also impart "lift" to the solar surface of the hoof, causing a compression/inflation motion of the sole corium and the suspensory lamellar apparatus as it exchanges heat with the frog area 60, which is depicted in dotted lines in FIG. 2, through the cold cryo/compression fluid flowing through the cryo/compression tubes 44.

FIG. 3 shows an approximate location and relationship of the terminal arch artery and circumflex artery 62 in the hoof 14 of the equine, where the cryo/compression solar bladder 40 encircles the third phalanx, with arteries that have traversed the bony trabeculae of the third phalanx. The depicted ends of the terminal arch artery 62 represent the approximate region of the arterial valve that the hoof 14 employs when the hoof is fully loaded in flexion angles up to 25-degree P3 palmar angles. Opening the valve of the terminal arch enhances arteriole pressure to the third phalanx and suspensory lamellar apparatus of the hoof wall 16.

Figure 4:
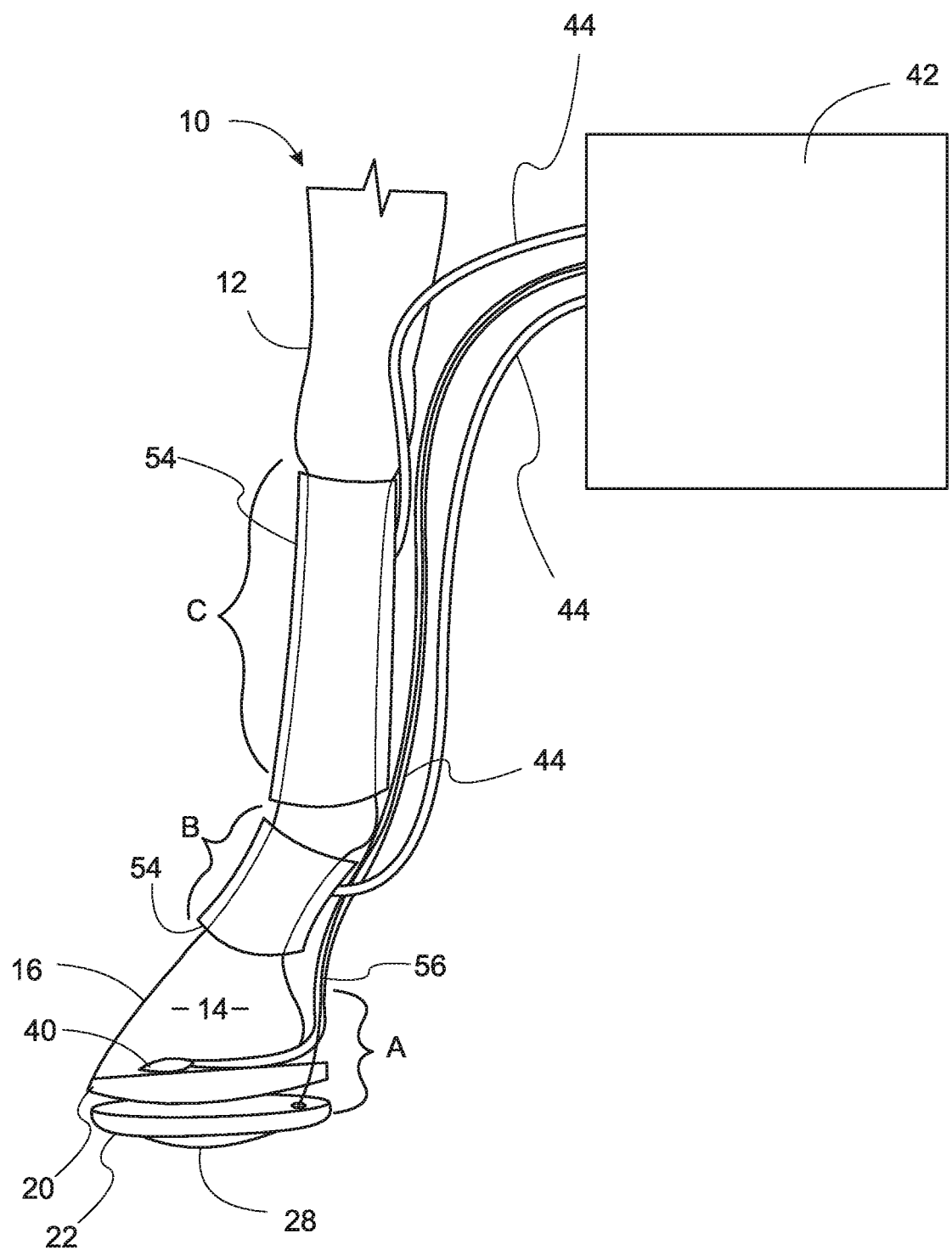
FIG. 4 is a lateral or side view of an illustrative biomechanical orthotic device having multiple cryo/compression zones.

Turning now to FIG. 4, but with continuing reference to FIG. 1, it will be appreciated that the equine biomechanical device 10 of the present invention may comprise multiple zones of cryo/compression. In one embodiment of the invention, cryotherapeutic fluid and compression are supplied to the hoof, defined as Zone A in FIGS. 1 and 4. Cryo/compression also may be supplied and applied to the area of the short pastern and/or the long pastern bone, represented in FIGS. 1 and 4 as Zone B, and to the area of the metacarpal or cannon bone, represented in FIGS. 1 and 4 as Zone C. The cryo/compression unit 42 may be adapted to supply cryotherapeutic fluid to all of the desired cryo/compression zones of the equine biomechanical orthotic device 10, with cryo/compression tubes 42 supplying each of the zones, or multiple cryo/compression units may independently supply each zone. The multiple zones of cryo/compression may have an on board or stall side cryo/compression refrigeration/compression units (not shown). The multiple zones of cryo/compression are adjustable in frequency and amount of compression and cooling. A second vibratory motor 58 may be secured to the caudal leg just below the carpus/hock. The vibration of the second vibratory motor 58 provides a startle stimulus for the carpus to be flexed, thus contributing to the unloading of the hoof in the SLL patient. The cryo/compression wraps 54 may encase the cryo/compression tubes 44 supplying the respective zones and the power cables 56 of the vibratory motors 50 and 58 as they ascend the leg 12. Additionally, a battery pack (not shown) may be supported at the girth or neck of the horse.

Figure 9:
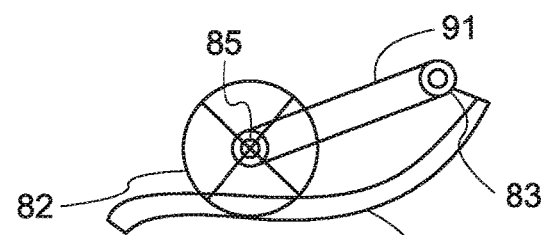
FIG. 9 shows a lift wheel traveling in the undulating track.
Figure 13:
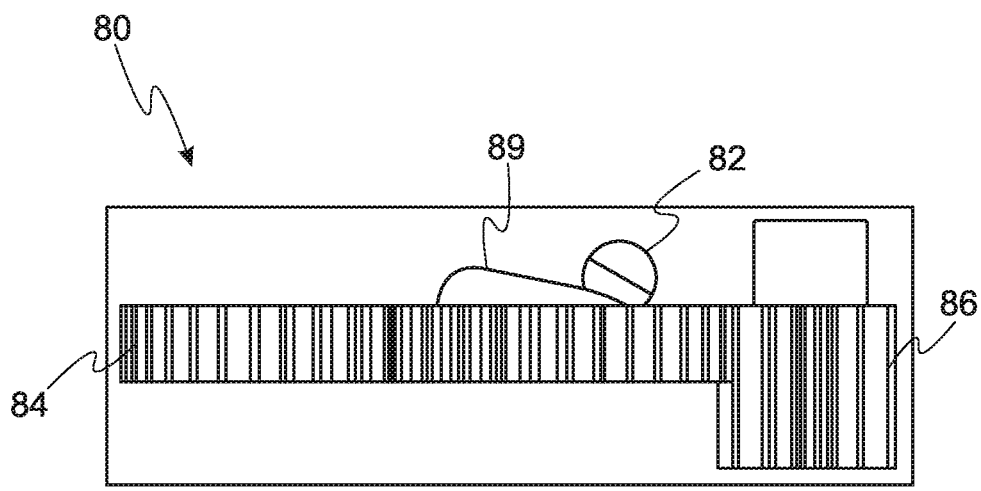
FIG. 13 shows a side view of large drive gear, small drive gear and lift wheel of FIG. 12.
Figure 14:
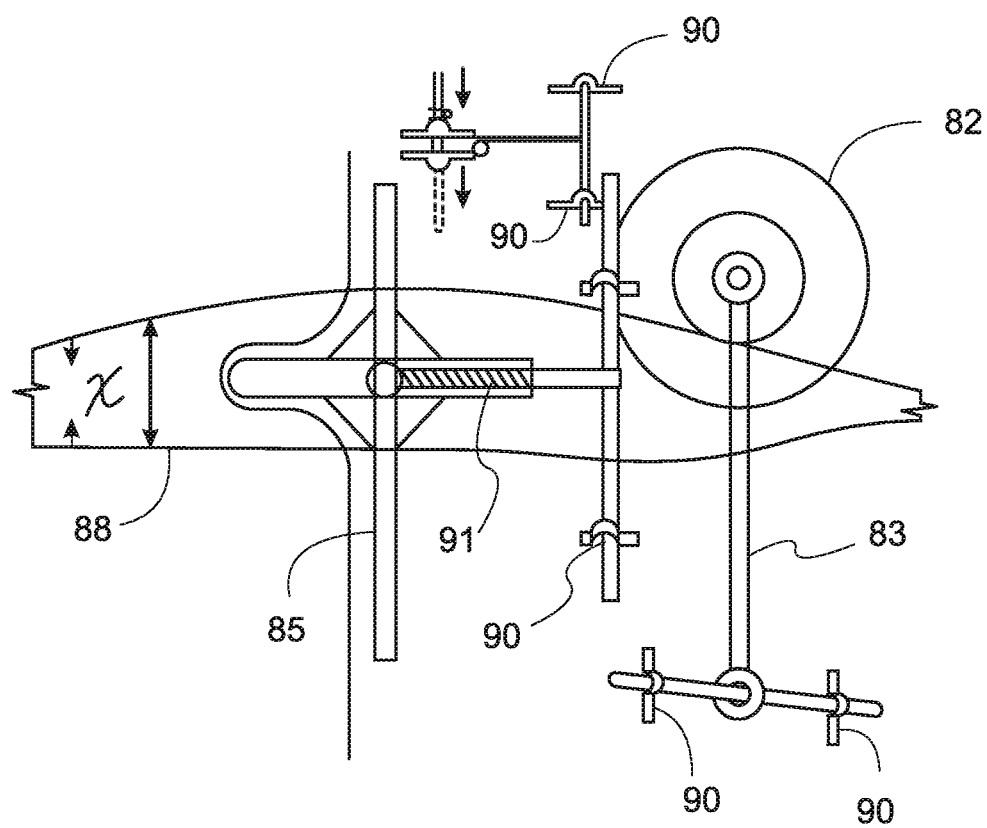
FIG. 14 is another view of the lift wheel positioned within the undulating track.
Figure 15:
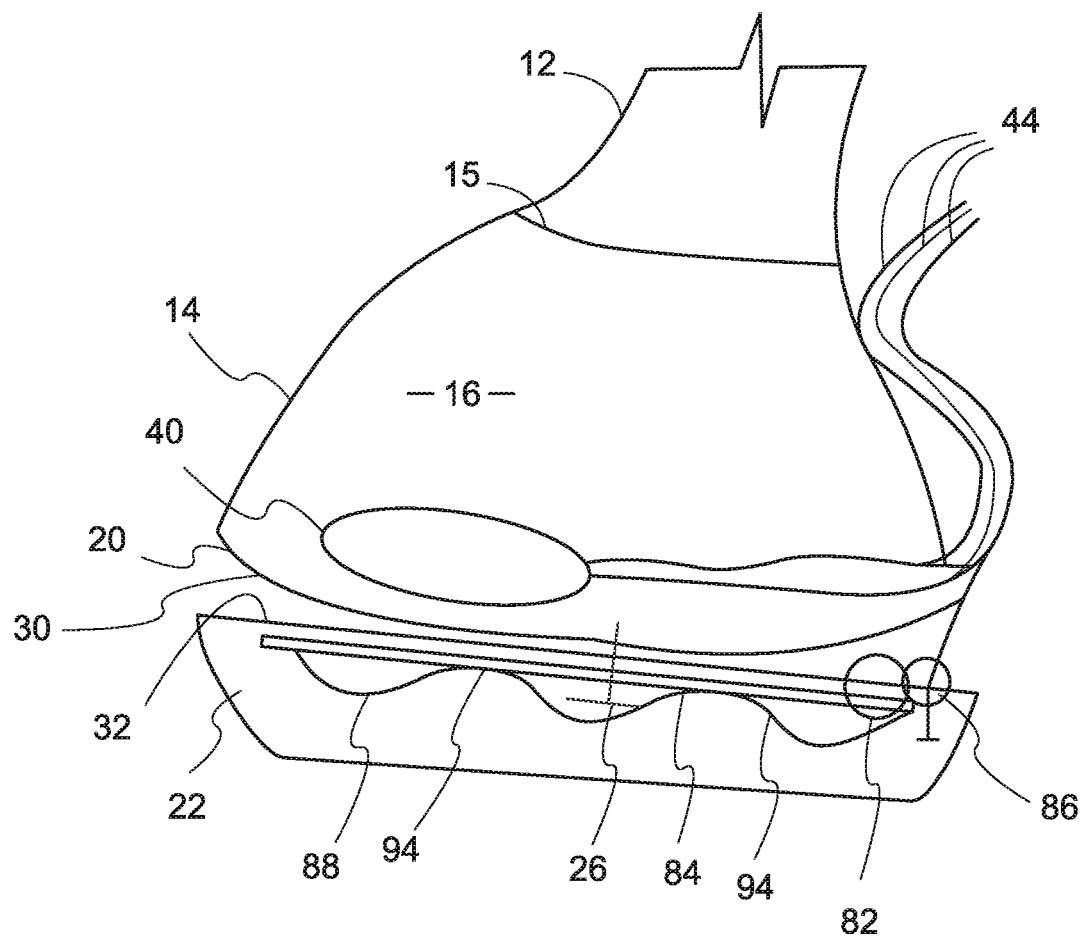
FIG. 15 depicts a lateral view of the upper pad and lower pad and the location of the cryo/compression solar bladder, demonstrating the rolled toe/heel design of the upper pad which allows the range of motion necessary to produce the 25-degree pitch down and negative 12 degrees of the third phalanx, while the undulating track and drive gear assembly are shown contained within the lower pad.
Figure 16:
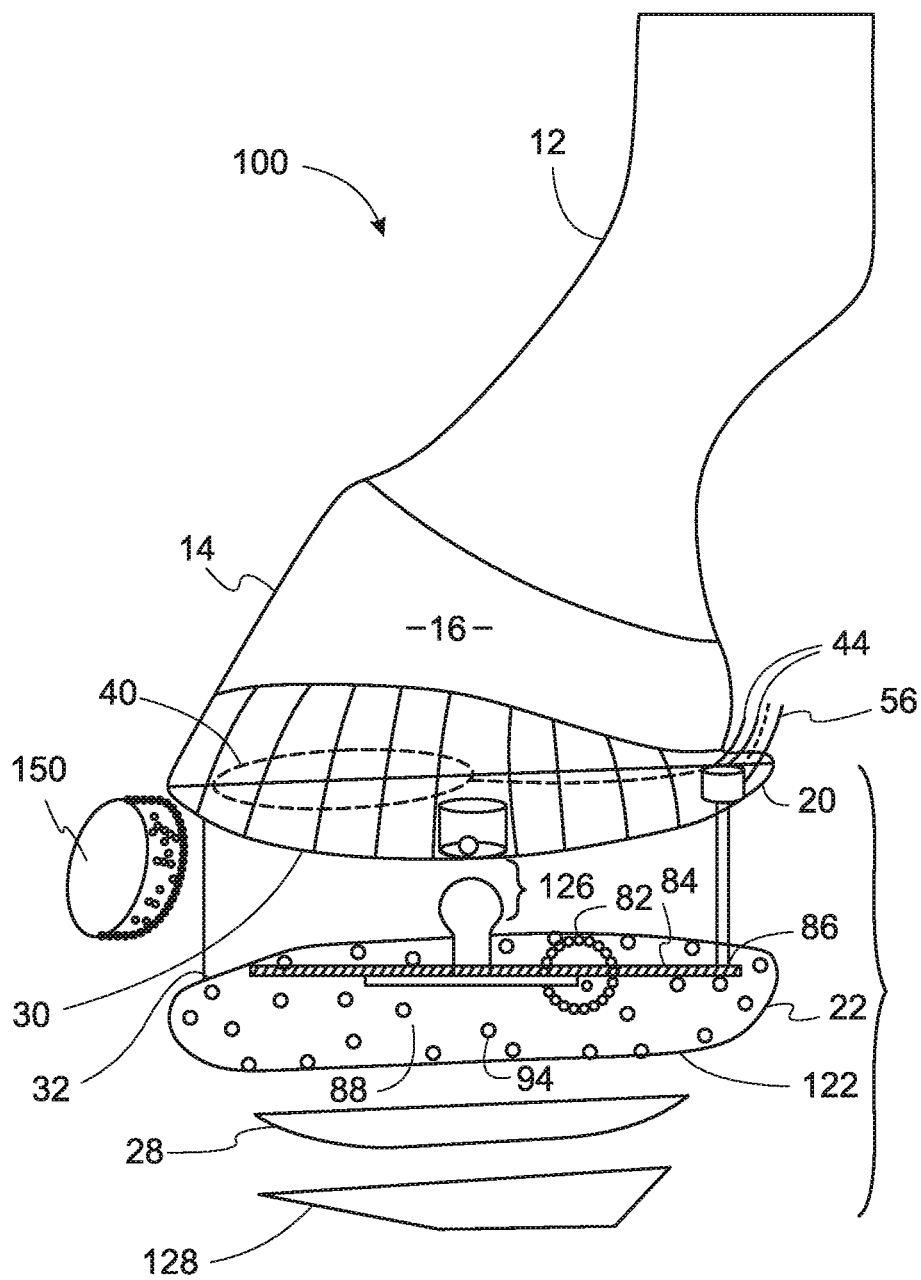
FIG. 16 shows an illustrative alternative embodiment of the equine biomechanical orthotic device of the present invention, connecting the upper and lower pads together to allow the omnidirectional motion.

Turning to FIGS. 5 through 14, a biohydraulic, or hemodynamic system by which movement of the upper pad 20 and the lower pad 22 is accomplished now will be described. In one embodiment of the invention, a rotating gear system 80 provides a mechanism to operate a lift wheel 82 attached to a large rotating drive gear 84, such as a spur gear. The large drive gear 84 is driven by one or more smaller drive gears 86 for speed/torque modifications and tuning. The lift wheel 82 will rotate in an undulating track 88, as seen in FIGS. 9 and 15, that is responsible for the upward and downward motion of the upper pad 20 and the hoof 14 of the equine. The undulating track 88 is generally circular in shape and comprises varying depths x formed in the lower pad 22, thus forming an undulating path in which the lift wheel 82 travels. The track 88 will provide variations in depth through wedges or ramps 94 which create drops or elevations in the travel path of the lift wheel 82 to encourage hydraulic movement in the biomechanical orthotic device 10. The depth of the circular, undulating track 88 within the lower pad 22 varies from about half the depth of the lower pad 22, and the thickness of the lower pad will vary with the particular needs of the horse. The undulating track 88 varies in diameter from about one inch (about 2.54 cm) to about eight inches (about 20.32 cm). The track 88 may be form in the contact surface 30 of the upper pad 20 and the contact surface 32 of the lower pad 22 to provide lift. The size of the lift wheel 82 will have a height ranging from about ¾ inches (1.905 cm) to 2 inches (5.08) and a width of about ¼ (0.635 cm) to about 1 inch (2.54 cm). The dimensions of the lift wheel 82 are dependent upon the thickness of the lower pad 22 and the dimension of the hoof 14.

Figure 5:
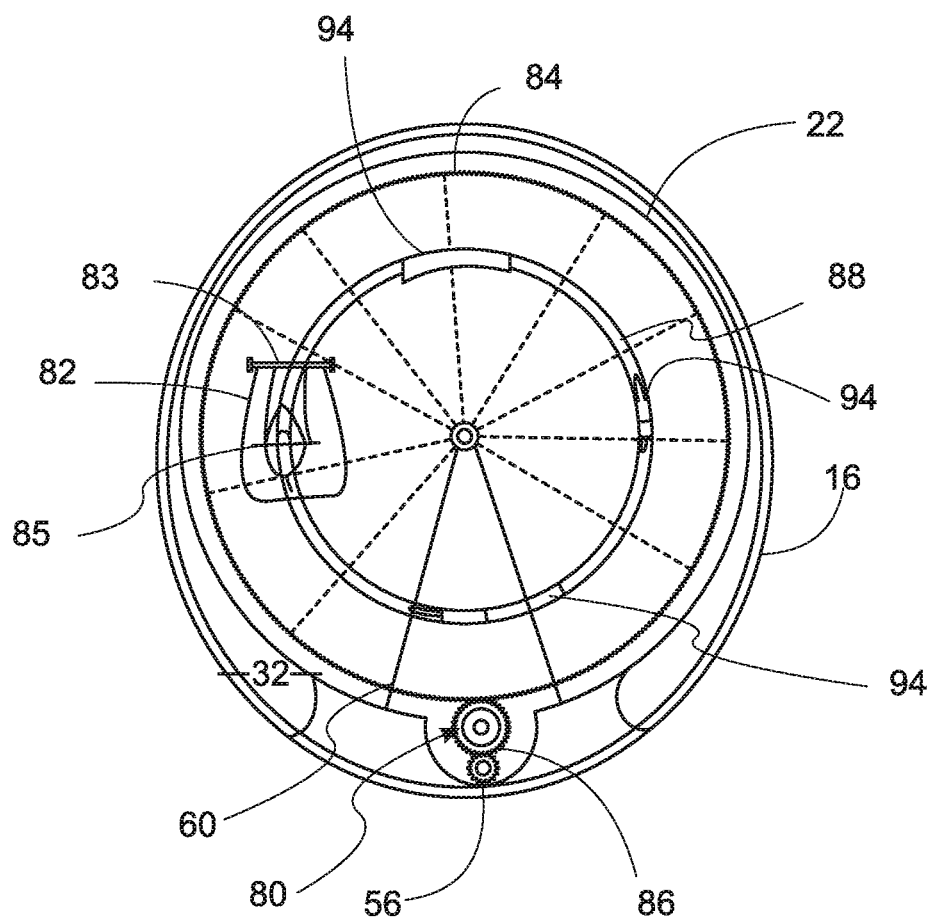
FIG. 5 is a view of the contact surface of the lower pad and shows an illustrative lift wheel in assembled configuration with an illustrative rotating gear system in cooperative engagement with an undulating track, and demonstrating the lower pad in relation to the hoof.
Figure 7:
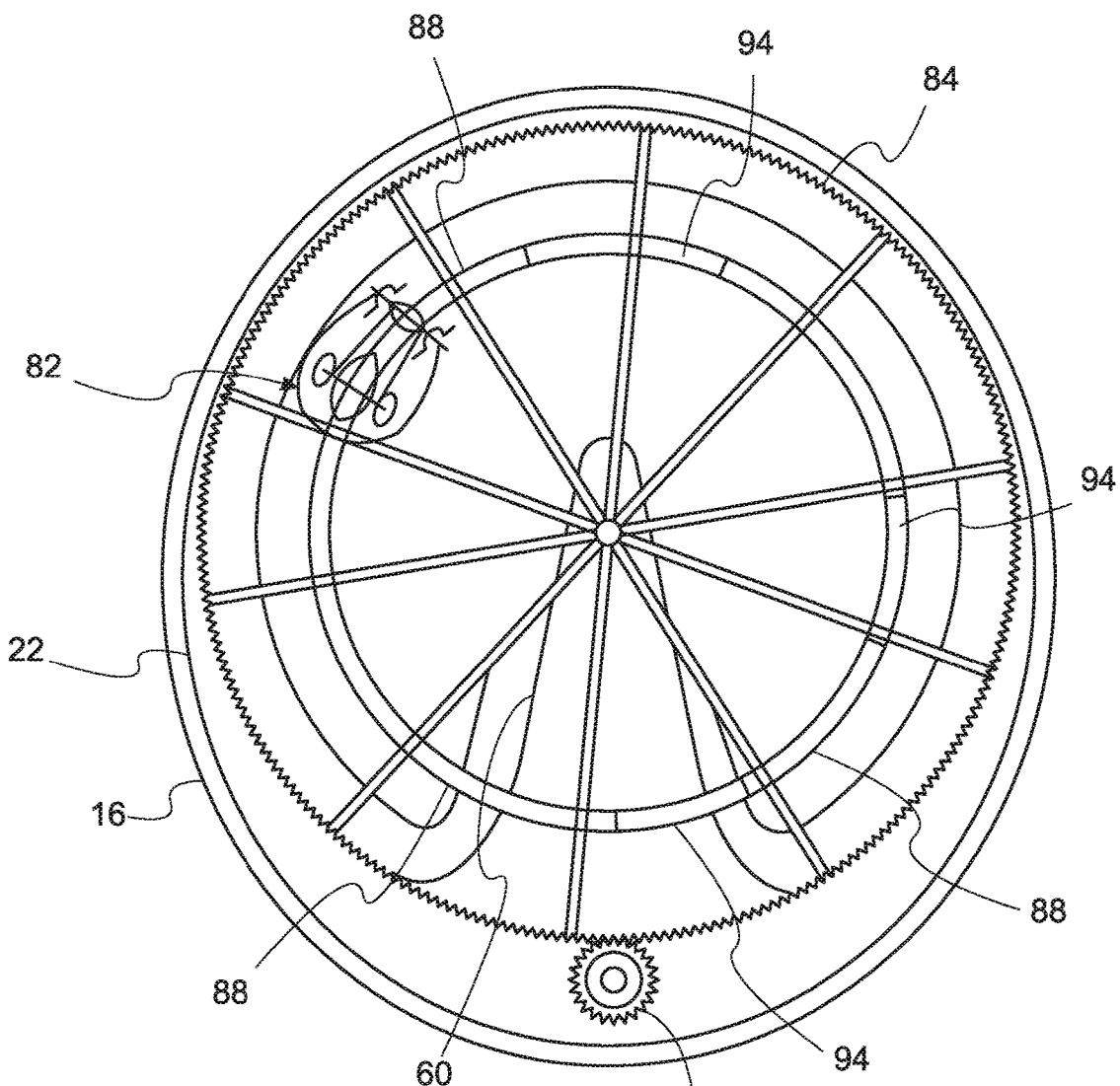
FIG. 7 is another view of the contact surface of the lower pad and shows an illustrative lift wheel in assembled configuration with an illustrative rotating gear system and in cooperative engagement with an undulating track.
Figure 8:
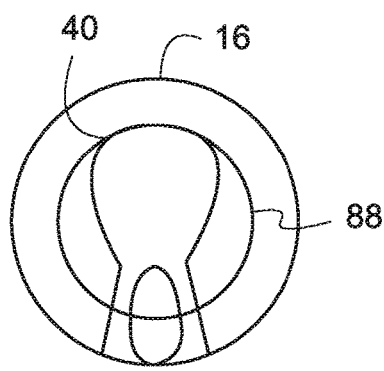
FIG. 8 depicts an illustrative location of the cryo/compression bladder with respect to the undulating track and the hoof wall.

The large drive gear 84 and the small drive gear 86 are contained within or upon the lower pad 22 and will be driven via the power cable 56 that passes through the upper pad 20 as shown in FIGS. 5 and 7. The power cable 56 attaches to the small drive gear 86 that is secured to the lower pad 22 in the area proximal to or just below the heel bulbs. The power cable 56, cryo/compression tubes 44, and electrical wires 52 may ascend the leg to power source(s) supported on the equine or located in the stall area.

Figure 10:
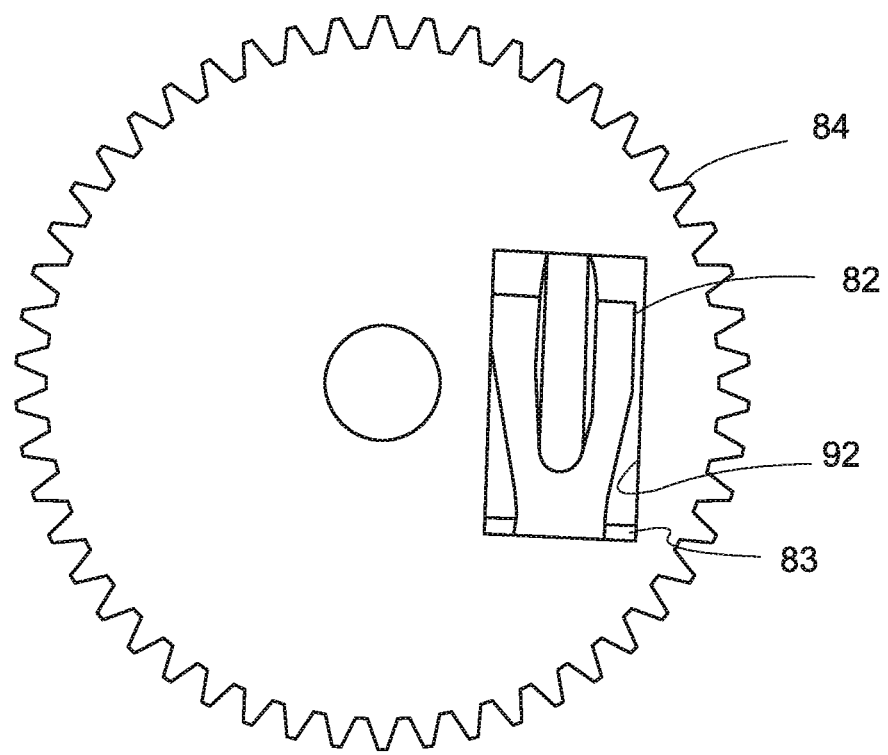
FIG. 10 depicts an illustrative large drive gear of the equine biomechanical orthotic device of the present invention, wherein the lift wheel is supported within an aperture in the large drive gear.
Figure 11:
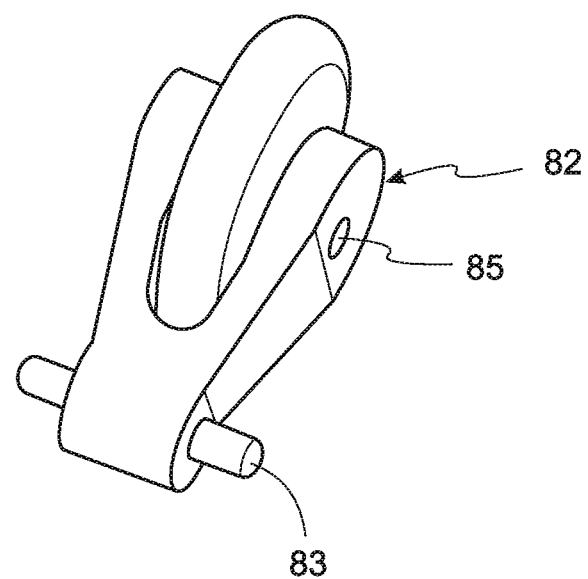
FIG. 11 depicts an illustrative lift wheel of the equine biomechanical orthotic device of the present invention, the lift wheel producing the pitch and roll of the hoof as the wheel travels in the circular, undulating lift tract.

The undulating track 88 causes the lift wheel 82 to force the upper pad 20 and the 14 hoof of the equine to pitch and roll as the gears 84 and 86 rotate. The lift wheel 82 produces the pitch and roll of the hoof 14 as the lift wheel travels in the circular, undulating lift tract 88. As seen in FIG. 14, the lift wheel 82 is connected to the upper surface 32 of the lower pad 22 via various fasteners 90. As shown in FIGS. 10 and 11, the lift wheel 82 is adapted to oscillate up and down on an extended arm or axle 83 as it rotates on its primary axle 85, providing mechanical lift to the upper pad 20 and hoof 14. The physics of motion will encourage the movement of the biohydraulics within the hoof 14 as weight and GRF's or forced hoof motions interact at the suspensory lamellar apparatus interface with the abundance of hemodynamic vascularity. The toe down pitch will shift weight and compressive forces to the suspensory lamellar apparatus of the dorsal wall as it unloads the terminal arch arterial valve when a palmar angle being 15 to 35 degrees is achieved, with 25 degrees being preferred in one embodiment of the invention. As the lift wheel 82 rotates around the undulating tract 88, the mediolateral roll will shift the vectored force load to the various areas of the suspensory lamellar apparatus's biohydraulic arteriole/venous/lymphatic system. The lift/wedging undulating track 88 will produce a mechanical lift to the toe area of the upper pad 20 and hoof 14 and result in a negative palmar angle of the third phalanx, ranging from about 10 degrees to about 20 degrees, with 12 degrees being preferred in one embodiment of the invention. This will overload the frog/digital cushion/bars/heel walls and cause a compressive load to the biohydraulic systems in the region as it unloads the biohydraulics of the anterior/dorsal hoof. The extra loading of the frog/digital cushion 60 mimics the necessary heel landing of the healthy hoof in engaging the caudal hoof's hydraulic, proprioceptor systems to coordinate and engage the hemodynamic/nutritional/lymphatic systems of the hoof 14.

The lift wheel 82, with the extending axle 83, is attached to the large gear 84. The lift wheel 82 rotates around the undulating track 88, keeping motion in the suspensory lamellar apparatus, frog/digital cushion, and other structures of the hoof 14 and limb 12. FIG. 5 shows a dorsal or top view of the contact surface 32 of the lower pad 22 and shows the rotating lift wheel 82 as attached to the large drive gear 84. The ramped and wedged undulating track 88 causes the lift wheel 82 to force the upper pad 20 and hoof 14 to pitch and roll as the gear 84 rotates. The gears 84 and 86 are encased in the lower pad 22 to protect their movements and keep out debris. The hoof wall projects distally from the upper pad 20. The shadow of the frog area 60 of the equine is shown at the caudal region in the FIG. 5. FIGS. 10 and 11 show the drive gears 84 and 86, where the lift wheel 82 is illustrated as a sphere. A connecting/supporting ball joint 89 will emerge from a central hole 87 in the large gear 84.

Figure 6:
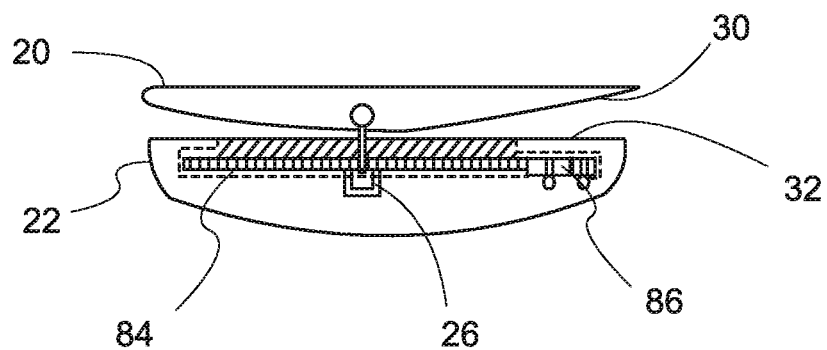
FIG. 6 is a side view showing the upper pad in assembled configuration with the lower pad and a partial cutaway view of the rotating gear system within the lower pad.

FIGS. 5 and 7 show the contact surface 32 of the lower pad 22 while FIGS. 6 and 15 show lateral or side views of the lower pad 22 in assembled configuration with the upper pad 20 on the hoof 14 of the equine. The location of the cryo/compression solar bladder 40 and rolled toe/heel design of the upper pad 20 allows the range of motion necessary to produce the 25-degree pitch down and negative 12 degrees of the third phalanx. The drive gear assembly 80 is contained within the lower pad 22, and the drive cable 56, cryo/compression tubing 44, vibratory wiring 52 is shown.

Figure 12:
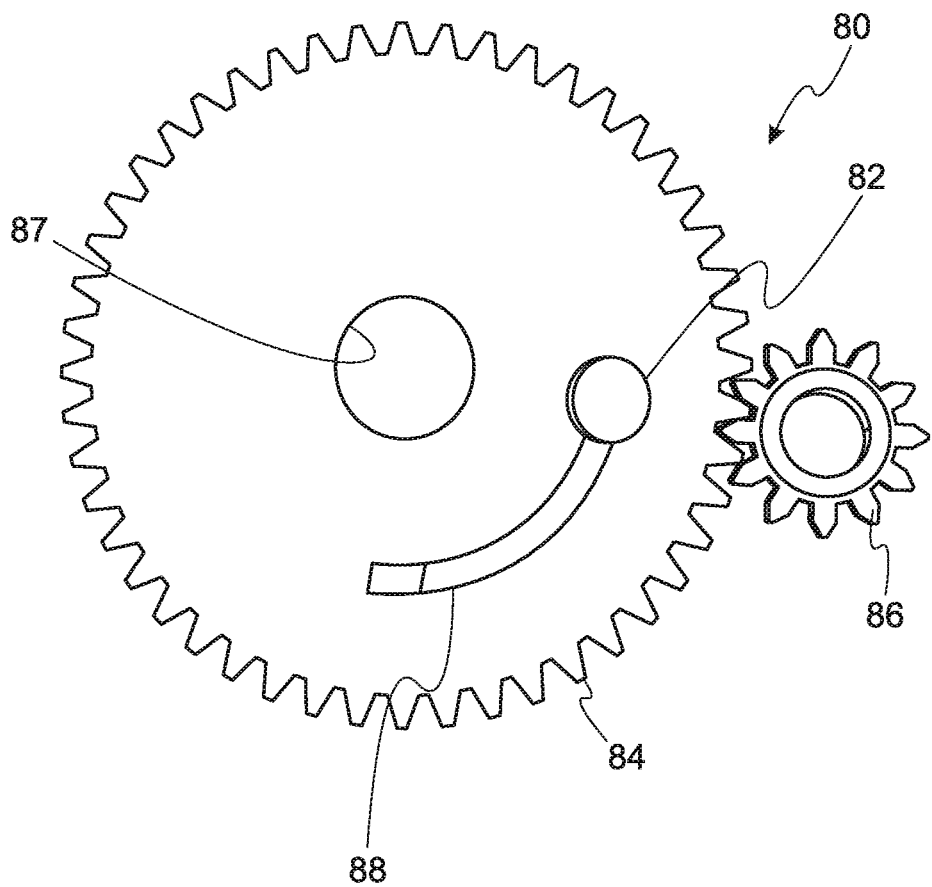
FIG. 12 shows a top view of an illustrative large drive gear and small drive gear of the rotating gear assembly of the equine biomechanical orthotic device of the present invention, wherein with the sphere represents the lift wheel.

As seen in FIGS. 12 and 13, the large drive gear 84 contains the lift wheel 82 which operates in an aperture 92 formed within the large drive gear to allow the undulation of the lift wheel 82 as it rotates around the track 88 on both the lower pad 22 and the upper pad 20. The center of the large drive gear 84 contains the pivot joint 26, which in one embodiment of the invention comprises a ball or male portion of a ball and socket connecting apparatus 26 and the upper pad 20 contains the socket or female portion of the pivot joint 26.

Turning now to FIG. 16 through 20, an alternative embodiment of an equine biomechnical orthotic device 100 constructed in accordance with the present invention is shown. The alternative embodiment mimics the shape of the hoof 14, contains forced motion components, maintains its position on the hoof 14 and on the ground, and encourages movement with a stability component. The opposing upper pad 20 and lower pad 40 cooperate together to allow omnidirectional motion of the biomechanical orthotic device 100 with a ball and socket joint 126, whereby the upper pad 20 and lower pad 22 are secured together yet offer an omnidirectional range of motion. The ball and socket joint 126 comprises a socket 127 formed with a base plate 129 in the upper pad 20, and a ball joint 131 formed with a base plate 132 in the lower pad 22. The upper pad 20 and the lower pad 22 can be assembled and disassembled via a pin/set screw removal to allow the equine to walk with a lower shoe profile or for servicing/altering the upper pad 20 and lower pad 22.

The upper pad 20 of the alternative embodiment may be secured to the hoof wall 16 with nails, screws, casts, adhesive, pad cuffs or combinations of the foregoing. Additionally, hoof casting tape may be wrapped around the perimeter of the area where the hoof 14 and upper pad conjoin to help secure the upper pad 20 to the hoof wall 16.

The external space between the upper pad 20 and the lower pad 22 will be occupied by an elastomeric material 150, such as foam or gel or an elastomeric gel ring that will keep stall debris out of the internal mechanisms/space. Additionally, the gel or EVA contributes to a range of motion stopping points and provides a rebound apparatus tool to return the hoof 14 to neutral. Suitable elastomeric materials include elastic wrap material, such as Vetrap®, Elastikon®, recycled bicycle inner tubes, rubber, and nano tape. The bicycle inner tube can be fashioned and attached to contribute to the function of the biomechanical orthotic device 10. It is a safety factor in the SLLp case to insure the consistent range of motion cycling, oscillating motion. The system can be adjusted to reduce or add moments to breakover (inverse relationship to rollover) to achieve a more desirable weight equilibrium. Elastic, ethylene vinyl acetate, gel, or rubber rebounding stops with triangular designs can be added to the toe and/or heel inter-pad areas to aid in retrograde rebound if the horse manually overloads the orthotics favoring/overloading breakover or rollover.

The periphery of the biomechanical orthotic device 10 can be protected from straw, sawdust, manure, or other materials by wrapping the inter-pad space with elastic wrap material such as Vetrap@, Elastikon@, or recycled bicycle inner tubes, rubber, foam rubber or nano tape).

For either embodiment, the cryo/compression solar bladder 40 and cryo/compression tubing 44 should be added to the solar surface of the hoof 14 prior to attaching the upper pad 20. Sole silicone impression material (SIM) or dental impression material (DIM) can be added to the sulci of the frog or sole to aid in the biohydraulic pumping mechanism of the frog/digital cushion/and the cryo/compression bladder 40. In cases of laminitis, maximum efficiency of the hemodynamic system is very desirable to help re-establish and maintain the damaged suspensory lamellar apparatus circulation and minimize pain. The effect of properly applied SIM/DIM will oftentimes result in an exaggerated hoof/sole growth. This often has an immediate palliative and long-term curative effect in laminitic cases. SIM with a durometer of 40 used in the frog sulci, is an efficient and effective use of the GRF, or in this application of the orthotic's artificially and mechanically produced GRF's, without painful side effects. This allows very minimal movements of the horse to be converted into a proper, maximized hydraulic flow. The biomechanical orthotic device of the subject invention applies physical forces similar to a medic's hands doing CPR or the GRF of locomotion.

SIM is applied into the palmar hoof to adequately fill the medial and lateral sulci of the frogs. Generally, the SIM is confined to the palmar half of the hoof and the hoof is fully loaded with the shoe/pad in place prior to the SIM setting up. Applying the orthotic with the horse in the prone position will require the manual loading of the SIM prior to its curing. This can be done using compression devices, such as hoof testers, portable battery powered impact tools, or a compression tool. Screws can be used to compress and load the upper shoe 20 onto the SIM, prior to curing, setting up after mixing the two-part silicone compound). The SIM is to provides a filler between the ground and the frog such that there is no compression on the frog when the hoof 14 is unloaded. Using too much SIM and allowing it to cure can cause heel pain and lead to more unwanted, painful compression of the caudal vasculature of the SLLp and the acute laminitis case. The proper hoof trim is vital to provide a functionally sound frog/digital cushion engagement. If the SIM depth is in excess, the transference of the physical forces of heel landing into hydraulics can be diminished or nullified. If the durometer of the SIM is too low, the transference of the forces of the GRF/WF or dynamic motion of the biomechanical orthotic device can be severely diminished. In cases of laminitis, the physical energy (movement) is minimal; therefore, the maximum usage (efficiency) of these forces is crucial. Any movement of the horse or this orthotic needs to be converted into fluid hydraulics (blood flow) with loading (WF) properly and ergonomically applied to ensure normal hydraulic flow (direction).

The cryo/compression tubing 44 will exit the back of the biomechanical orthotic device 110 and will attach to the cryo/compression unit 42 either attached to the horse or stall side, depending on the needs and tolerance of the patient.

The lower pad 22 is detachable and adjustable. Other attachable and detachable pad designs may be needed for an individual hoof's biomechanics due to conformation or patient loading preferences. When specialized adjustments of the breakover are necessary, it may not be sufficient to confine the adjustment mechanism to the upper pad 20, already described. Accordingly, supplemental pads may be attached to the bottom surface 122 of the primary lower pad 22. The supplemental pads can significantly reduce the size of the ground-contacting footprint of the lower pad 22, and are shaped to perform a specific adjustment that may be required, including tapered anterior (dorsal), posterior (caudal), medial and lateral surfaces. Similarly purposed supplemental pads can also be shaped as wedge pads 128 that can raise or lower either of the respective sides of the hoof 14 or its dorsal/caudal portion, depending on the adjustment needed. An inverted dome bubble pad 28 would be suitable for this purpose. The bubble pad 128 would reduce the moment arm forces to the entire perimeter of the hoof 14 and allow a minimum of effort to produce pitch, roll, or jaw movements of the hoof 14 and leg 12. Additional shapes may be used, including flat, square, round or crowned and are adapted to be attached to the primary pad in any configuration to obtain equilibrium for the distal phalanges.

The detachable base pad or plate 28 and/or detachable pad wedge 128 are attached to a bottom surface 122 of the lower pad 22 to aid in hoof mobility or loading. A half-ball bubble pad will provide a maximum amount of mobility with the least amount of resistance or moment arm forces. Unlike horseshoes that have sloping front edges, the lower pad 22 of the subject invention is unique in its ability to mount supplemental pads for more specific treatment. The supplemental pads such as 28 and 128 minimize moment forces that allow the hoof to roll, pitch, and jaw with a minimum of effort, yet allow the horse to maintain stability to the hoof 14 and leg 12 by considering the size and location of the third phalanx and not allowing the pad appliance to invade the borders of the solear profile of the P3. An additional lever reduction bubble pad 28 with internal bearing system can be added to allow yaw forces to be negated. This addition will be very useful in SLLp cases that will need to pivot around the supporting leg. This will remove destructive, orthotic displacing moment arm forces.

Figure 17:
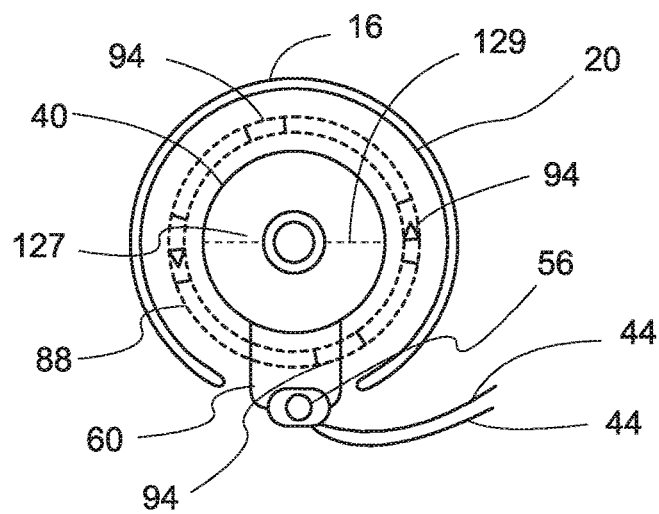
FIG. 17 is a view of the upper pad of the alternative embodiment of FIG. 16 and shows the undulating track and location of the omnidirectional socket in the upper pad.
Figure 19:
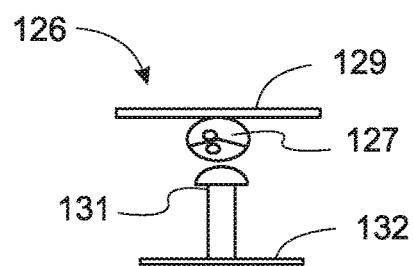
FIG. 19 shows an expanded view of connecting joint for the upper pad and lower pad of the alternative embodiment of the biomechanical orthotic device of the present invention, with ball of the lower pad and the socket of the upper pad in unassembled configuration.
Figure 18:
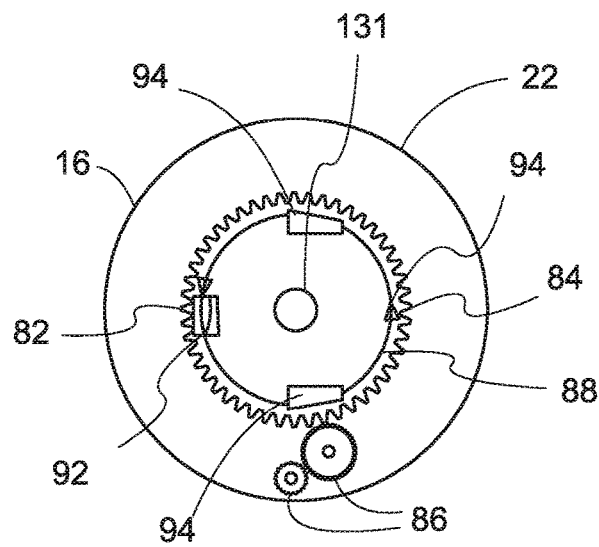
FIG. 18, being a view of the lower pad, shows the circular, undulating track and gear assembly for driving the lift wheel situated in the lower pad of the alternative embodiment of the biomechanical orthotic device of the subject invention.
Figure 20:
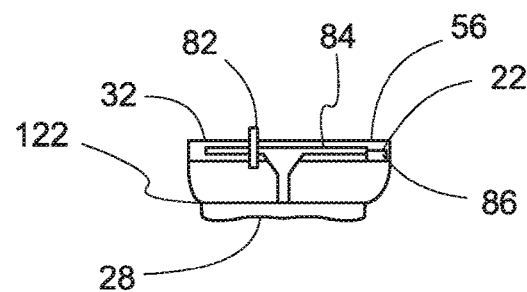
FIG. 20 illustrates a side view of the lower pad and lift wheel of the alternative embodiment of the biomechanical orthotic device of the present invention.

As seen in FIG. 17, the circular, ramped, undulating track 88 of the upper pad 20 is shown. FIG. 18, being a view of the lower pad 22, shows the circular, undulating lift track and gear mechanism to drive the lift wheel 82 situated in the lower pad. FIG. 19 shows an expanded view of joint 126, with ball 131 of the lower pad 22 and the socket 126 of the upper pad 20 in unassembled configuration. The lower pad 22 and lift wheel 82 are illustrated in a side view in FIG. 20, with attaching mechanical power cable 56.

Figure 21:
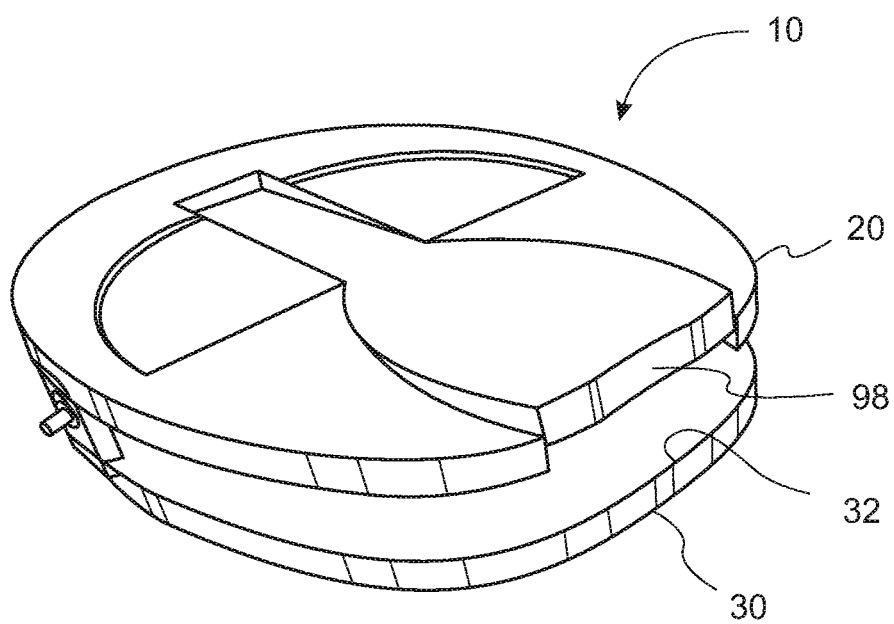
FIG. 21 shows the biomechanical orthotic device of the present invention comprising an illustrative frog pad.

With reference to FIG. 21, the upper shoe 20 of the biomechanical orthotic device 10 or 100 may further comprise a frog pad 98 to accept or transfer the motion of the lift wheel 82 and actively apply an adjustable lifting force to the frog area 60 of the hoof 14, causing a breakover motion, or pitch to occur. The upper pad 20 and hoof 14 will pivot or pitch at the pivot joint 26 powered by the gear assembly 80. The biomechanical orthotic device 10 mimics or reproduces heel landing by engaging the frog 60 via the frog pad 98 with a timed cycle that moves in a circular back-to-front motion as it lifts the frog and heel of the hoof, mimicking hoof kinematics with the hoof being fully loaded in cases of SLL, or fully unloaded in cases of acute laminitis. The kinematics mimic the deep digital flexor tendon as it forces breakover in the static hoof 14, thereby, providing the mechanics to lift the heel of the hoof to implement pitch. When sufficient pitch is achieved, for example, at around 25 degrees, the blood impedance valve of the deep digital flexor tendon is ameliorated. The frog pad 98 may also have a pumping effect to the frog 60 and digital cushion.

Figure 22:
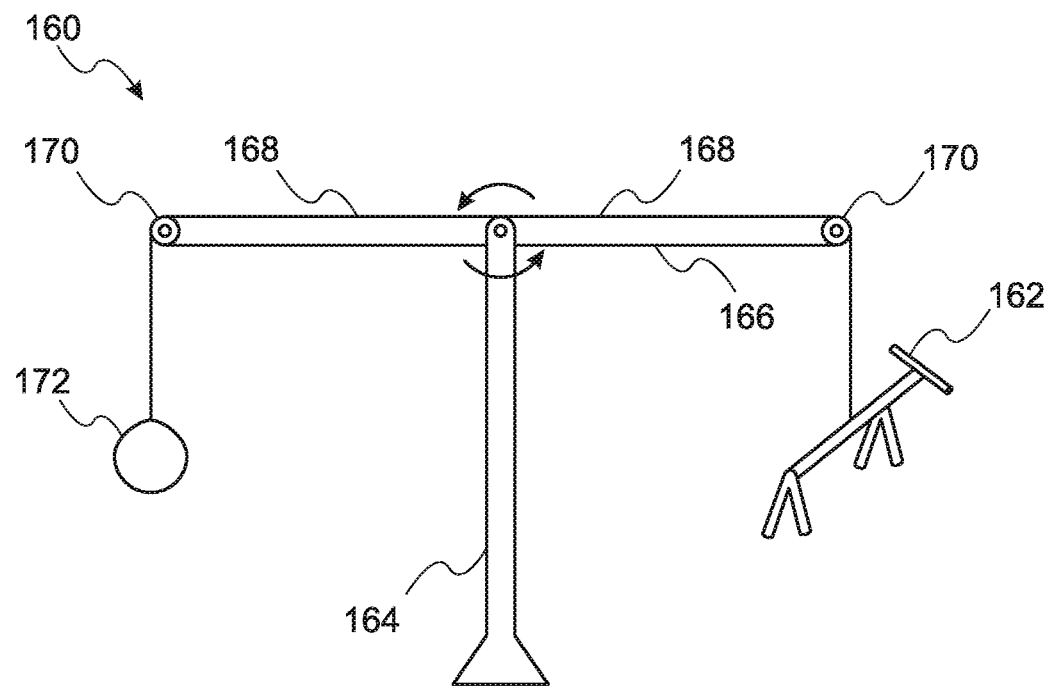
FIG. 22 is a side view of a counter-balanced sling that permits limited ambulation by the equine and which may be used to hoist the equine to attach, adjust or change the biomechanical orthotic device of the present invention.
Figure 23:
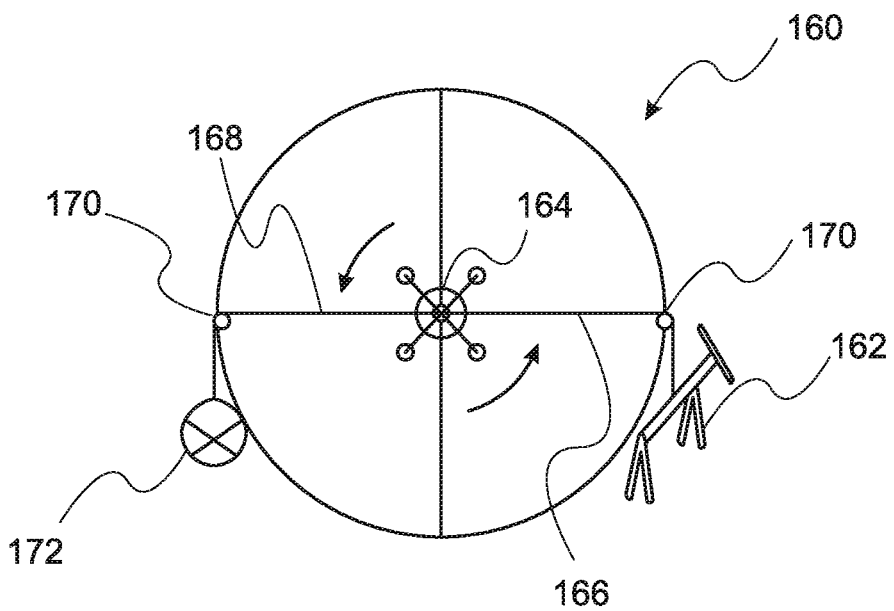
FIG. 23 is a top view of the counter-balanced sling of FIG. 22.

Turning now to FIGS. 22 and 23 [22], a counter-balanced sling 160 attached to the body of the equine 162 provides limited ambulation and may be used to hoist the equine to attach, adjust or change the biomechanical orthotic device 10 or 100. The counter-balanced sling 160 comprises a central axle 164 and a support arm 166. One or more pulleys 170 attach to a remotely placed counterbalance weight 172, which in one embodiment of the invention is a water bag which permits water weight addition or extraction, as needed, to hoist the equine 162 or to unload the limbs 12 of the equine in a variable manner. The counter-balanced sling 160 may be attached to the arm of a horse walker and allows the equine 162 to ambulate in circles around the central axle 164 with minimal weight on its limbs 12. The counter-balanced weight 160 may be adapted so that the equine 162 may lie down, at will. Totally hoisted equine patients typically do not tolerate slings, and the counter-balanced sling 160 would aid in the acceptance of confinement by the equine 162 to aid in unweighting the damaged and the normal limbs 12.

The present invention further is directed to a method of treating acute or chronic laminitis in an equine, as well as a variety of other hoof pathologies and dysfunctions. The foregoing description of the equine biomechanical orthotic device is incorporated herein. The method employs steps to cyclically load and offload weight force/ground reaction force interaction to enhance perfusion of the supporting lamellar apparatus, solar corium, and other hoof structures with nutrient laden blood and removal of the lymph fluid with toxic waste products. The method employs steps to force cyclic hoof motion of the loaded or unloaded patient in a lateral recumbency pained hoof. The motion is applied to hydraulically force or enhance the tissue perfusion of the hoof's internal structures and enhance or reestablish normal health of the hoof. Various externally applied forces are utilized, including mechanical, electrical, hydraulic, and other manners, to increase the reduced or non-existent cyclic loading of the limb. The method employs the step of measuring and recording movement and adjusting cyclic frequencies and range of motion. The method employs the use of atraumatic, biomechanically sound motion such as ambulation or off-loading. The method employs the use of breakover, rollover modifications, weight redistribution, P3 stabilization, and atraumatic movement to treat and healing the afflicted hoof. The method uses of a variety of biomechanics and therapies to achieve the maximum number of advantages that may be obtained in the compromised or over-loaded hoof. The method employs the use of cryotherapy to stop the enzymatic, toxin induced degradation of the basal cell bonds/cellular health of the secondary epithelial lamellae to the basement membrane of the secondary dermal lamellar, and properly times and applies cryotherapy to the at-risk patient's hoof 14 and limb 12. The method employs the use of vibration to the hoof proper and behind the carpus or hock on hinds. Vibration therapy provides motion to the internal structures of the hoof and alters pain perception. The vibration may provide a startle stimulus for the carpus to be flexed, thus contributing to the unloading of the hoof in the SLL patient.

It now will be appreciated that the present invention presents a new equine biomechanical orthotic device that will encourage an increase in cyclic limb loading/unloading of specific regions of the SLA, even with the limb fully loaded, with the use of forced hoof motion to alter the interlamellar/intralamellar hydraulics by cyclically and forcefully altering load/motion to regions of the lamellar apparatus and corium of the sole vascular network of the treated hoof. Weight force/ground reaction force interaction is cyclically loaded and offloaded to enhance perfusion of the supporting lamellar apparatus, solar corium, and other hoof structures with nutrient laden blood and removal of the lymph fluid with toxic waste products. The device causes a forced cyclic hoof motion of the loaded or unloaded patient in a lateral recumbency pained hoof. The motion is applied to hydraulically force or enhance the tissue perfusion of the hoof's internal structures and enhance or reestablish normal health of the hoof. Various externally applied forces are utilized, including mechanical, electrical, hydraulic, and other manners, to increase the reduced or non-existent cyclic loading of the limb. The device can be used to measure/record movement and adjust cyclic frequencies and range of motion.

The invention has been described above both generically and with regard to specific embodiments. Although the invention has been set forth in what has been believed to be preferred embodiments, a wide variety of alternatives known to those of skill in the art can be selected with a generic disclosure. Changes may be made in the combination and arrangement of the various parts, elements, steps and procedures described herein without departing from the spirit and scope of the invention as defined in the following claims.

I claim:

1. An equine biomechanical orthotic device for treating a hoof of the equine, the equine biomechanical orthotic device comprising: an upper pad adapted to be arranged below the hoof of the equine; a lower pad arranged below the upper pad; wherein the upper pad forms a contoured contact surface for engaging the lower pad and wherein the lower pad forms a contoured contact surface for engaging the upper pad and wherein the contoured contact surface of the upper pad and the contoured contact surface of the lower pad, when in cooperative engagement, allow the upper pad and the hoof to pitch up to 25 degrees dorsopalmarly and to roll mediolaterally up to five degrees.

2. The equine biomechanical orthotic device of claim 1 further comprising a pivot joint for cooperatively engaging the upper pad and the lower pad.

3. The equine biomechanical device of claim 2 wherein the pivot joint comprises a ball and socket joint that is configured to secure the upper pad and lower pad are secured and omnidirectional range of motion.

4. The equine biomechanical device of claim 3 wherein the ball and socket joint comprises a socket formed in the upper pad and a ball joint formed in the lower pad.

5. The equine biomechanical orthotic device of claim 3 where the ball and socket joint is configured to be adjusted to service or alter the upper pad and the lower pad.

6. The equine biomechanical orthotic device of claim 1 further comprising a base plate or base pad positioned below the lower pad to provide mobility.

7. The equine biomechanical orthotic device of claim 1 further comprising a cryo/compression solar bladder.

8. The equine biomechanical orthotic device of claim 7 wherein the cryo/compression solar bladder is adapted to be positioned proximal to or inserted in the base of the third phalanx of the hoof of the equine.

9. The equine biomechanical orthotic device of claim 8 further comprising a cryo/compression unit to intermittently pressurize and cool the hoof and to produce pressure beneath the base of the third phalanx between the hoof and the upper pad.

10. The equine biomechanical orthotic device of claim 7 further comprising a plurality of cryo/compression zones.

11. The equine biomechanical orthotic device of claim 7 further comprising a vibratory device for vibrating the hoof.

12. The equine biomechanical orthotic device of claim 1 further comprising a biohydraulic system for moving the upper pad and the lower pad in cooperative engagement.

13. The equine biomechanical orthotic device of claim 12 wherein the biohydraulic system comprises:
a gear system positioned in the lower pad;
a lift wheel driven by the gear system, the lift wheel being positioned in the lower pad;
a track formed in the lower pad, in the upper pad or both;
wherein the lift wheel travels in the track and is adapted to move the upper pad and the hoof of the equine.

14. The equine biomechanical device of claim 13 wherein the track is generally circular and undulates within the lower pad or the upper pad or both to create variations in elevation in the travel path of the lift wheel.

15. The equine biomechanical device of claim 14 wherein the track further comprises ramps or wedges to create variations in the travel path of the lift wheel.

16. The equine biomechanical orthotic device of claim 1 further comprising a frog pad.

17. A method of treating laminitis and other pathologies in a hoof of an equine, the method comprising the steps of: providing an orthotic device below the hoof of the equine, the orthotic device comprising: an upper pad adapted to be arranged below the hoof of the equine; a lower pad arranged below the upper pad; wherein the upper pad forms a contoured contact surface for engaging the lower pad and wherein the lower pad forms a contoured contact surface for engaging the upper pad and wherein the contoured contact surface of the upper pad and the contoured contact surface of the lower pad, when in cooperative engagement, allow the upper pad and the hoof to pitch up to 25 degrees dorsopalmarly and to roll mediolaterally up to five degrees; and causing movement of the orthotic device that causes the hoof to pitch dorsopalmarly and to roll mediolaterally, to produce a palmar pitch down of the heel region of the hoof.

18. The method of claim 17 further comprising the step of creating a valvular effect in the suspensory lamellar apparatus of the hoof of the equine and causing arteriole blood to be pumped into the interdigital arteries of the third phalanx of the hoof of the equine and on into the suspensory lamellar apparatus.

19. The method of claim 18 further comprising the step of supplying cryotherapeutic fluid beneath the base of the third phalanx of the hoof of the equine to cool the suspensory lamellar apparatus of the hoof.

20. The method of claim 19 further comprising the step of intermittently compressing the area beneath the base of the third phalanx to produce pressure on the hoof.

21. The method of claim 20 wherein the steps of cooling and compressing are combined to create a cryo/compression zone beneath the base of the third phalanx and comprises the step of opening the valve of the terminal arch of the hoof of the equine to enhance arteriole pressure to the third phalanx and suspensory lamellar apparatus of the wall of the hoof.

22. The method of claim 21 further comprising the step of providing multiple cryo/compression zones.

23. The method of claim 22 wherein the step of providing multiple cryo/compression zones comprises supplying a cryo/compression at the area of the hoof of the equine, at the area of the short pastern and/or the long pastern bone of the affected limb of the equine and at the area of the metacarpal or cannon bone of the affected limb of the equine.

24. The method of claim 20 further comprising the step of vibrating the hoof.

25. The method of claim 19 further comprising the step of imparting lift to the hoof, causing compression and inflation of the suspensory lamellar apparatus as it exchanges heat.

26. The method of claim 17 further comprising the step of providing a biohydraulic system for moving the upper pad and the lower pad in cooperative engagement.

27. The method of claim 26 wherein the step of providing a biohydraulic system for moving the upper pad and the lower pad in cooperative engagement comprises:
providing a gear system positioned in the lower pad, the gear system comprising:
a lift wheel driven by the gear system, the lift wheel positioned in the lower pad;
a track formed in the lower pad, or in the upper pad or in both;
wherein the lift wheel travels in the track and causes the upper pad and the hoof of the equine to move.

28. The method of claim 27 further comprising the step of causing the lift wheel to undulate in the track by creating drops or elevations in the travel path of the lift wheel to create hydraulic movement in the biomechanical orthotic device.

29. The method of claim 28 further comprising the step of, as the lift wheel rotates around the track, producing a mechanical lift to the upper pad and hoof of the equine and shifting compressive forces to the suspensory lamellar apparatus causing a negative approximately twelve degree palmar angle of the third phalanx.

30. The method of claim 17 further comprising the step of configuring the upper pad and the lower pad to create an omnidirectional range of motion in the orthotic device.

31. The method of claim 17, wherein the hoof of the equine has a breakover point and the method of claim 17 further comprises the step of moving the breakover in the hoof caudally to its normal position and reducing shear and tension forces to the suspensory lamellar apparatus.

* * * * *